United States Patent
Nair et al.

(10) Patent No.: US 8,719,385 B2
(45) Date of Patent: May 6, 2014

(54) SITE CONTROLLER DISCOVERY AND IMPORT SYSTEM

(75) Inventors: Ajay N. Nair, Bangalore (IN); Jerry Marti, West Salem, OH (US)

(73) Assignee: Honeywell International Inc., Morristown, NJ (US)

( * ) Notice: Subject to any disclaimer, the term of this patent is extended or adjusted under 35 U.S.C. 154(b) by 560 days.

(21) Appl. No.: 12/895,590

(22) Filed: Sep. 30, 2010

(65) Prior Publication Data

US 2011/0083077 A1 Apr. 7, 2011

Related U.S. Application Data

(63) Continuation-in-part of application No. 12/260,046, filed on Oct. 28, 2008.

(51) Int. Cl.
*G06F 15/177* (2006.01)
*G06F 15/173* (2006.01)
*G06F 9/445* (2006.01)

(52) U.S. Cl.
USPC .......................... 709/220; 709/224; 717/177

(58) Field of Classification Search
None
See application file for complete search history.

(56) References Cited

U.S. PATENT DOCUMENTS

| | | | |
|---|---|---|---|
| 4,375,637 A | 3/1983 | Desjardins | |
| 4,816,208 A | 3/1989 | Woods et al. | |
| 5,042,265 A | 8/1991 | Baldwin et al. | |
| 5,161,387 A | 11/1992 | Metcalfe et al. | |
| 5,385,297 A | 1/1995 | Rein et al. | |
| 5,390,206 A | 2/1995 | Rein et al. | |
| 5,544,036 A | 8/1996 | Brown, Jr. et al. | |
| 5,768,119 A | 6/1998 | Havekost et al. | |
| 5,929,761 A | 7/1999 | Van der Laan et al. | |
| 5,946,303 A | 8/1999 | Watson et al. | |
| 5,955,306 A | 9/1999 | Beheshti et al. | |
| 6,124,790 A | 9/2000 | Golov et al. | |

(Continued)

FOREIGN PATENT DOCUMENTS

| WO | WO 01/97146 | 12/2001 |
|---|---|---|
| WO | WO 02/052432 | 7/2002 |

(Continued)

OTHER PUBLICATIONS

Honeywell, "Excel Building Supervisor-Integrated R7044 and FS90 Ver. 2.0," Operator Manual, 70 pages, Apr. 1995.

(Continued)

*Primary Examiner* — Wen-Tai Lin
(74) *Attorney, Agent, or Firm* — Seager Tufte & Wickhem LLC

(57) ABSTRACT

An approach for site controller discovery, import and integration. A customer may purchase site controllers to be put at its remote location, sometimes prior to having network connectivity to the remote location. Eventually, the customer may want to integrate the remote site controller with a supervisor at its home facility. The approach may provide site controller discovery, import and integration including automation of integration of the deployed site controller configuration and enterprise hierarchy to the home facility supervisor with minimal user intervention. During importing and integration into the customer's supervisor, enterprise model data may be retrieved and added to the existing multi-site hierarchal structure with the supervisor. The import operation may automatically perform a configuration backup to complete the integration process. The configuration in the deployed site controller or controllers may be considered a master configuration. Therefore, by importing configuration data directly from such source, data transfer should be accurate.

21 Claims, 34 Drawing Sheets

(56) References Cited

U.S. PATENT DOCUMENTS

| | | | |
|---|---|---|---|
| 6,141,595 A | 10/2000 | Gloudeman et al. | |
| 6,178,362 B1 | 1/2001 | Woolard et al. | |
| 6,185,483 B1 | 2/2001 | Drees | |
| 6,195,309 B1 | 2/2001 | Ematrudo | |
| 6,223,544 B1 | 5/2001 | Seem | |
| 6,295,526 B1 | 9/2001 | Kreiner et al. | |
| 6,295,527 B1 | 9/2001 | McCormack et al. | |
| 6,314,328 B1 | 11/2001 | Powell | |
| 6,351,213 B1 | 2/2002 | Hirsch | |
| 6,356,282 B2 | 3/2002 | Roytman et al. | |
| 6,389,464 B1 * | 5/2002 | Krishnamurthy et al. | 709/220 |
| 6,420,968 B1 | 7/2002 | Hirsch | |
| 6,430,712 B2 | 8/2002 | Lewis | |
| 6,466,654 B1 | 10/2002 | Cooper et al. | |
| 6,473,407 B1 | 10/2002 | Ditmer et al. | |
| 6,492,901 B1 | 12/2002 | Ridolfo | |
| 6,535,122 B1 | 3/2003 | Bristol | |
| 6,549,135 B2 | 4/2003 | Singh et al. | |
| 6,643,355 B1 | 11/2003 | Tsumpes | |
| 6,675,591 B2 | 1/2004 | Singh et al. | |
| 6,681,156 B1 | 1/2004 | Weiss | |
| 6,690,980 B2 | 2/2004 | Powell | |
| 6,813,587 B2 | 11/2004 | McIntyre et al. | |
| 6,816,811 B2 | 11/2004 | Seem | |
| 6,832,120 B1 | 12/2004 | Frank et al. | |
| 6,870,141 B2 | 3/2005 | Damrath et al. | |
| 6,879,253 B1 | 4/2005 | Thuillard | |
| 6,892,546 B2 | 5/2005 | Singh et al. | |
| 6,919,809 B2 | 7/2005 | Blunn et al. | |
| 6,947,972 B2 | 9/2005 | Chun | |
| 6,955,302 B2 | 10/2005 | Erdman, Jr. | |
| 6,966,060 B1 * | 11/2005 | Young et al. | 717/177 |
| 6,973,627 B1 | 12/2005 | Appling | |
| 6,990,821 B2 | 1/2006 | Singh et al. | |
| 7,009,510 B1 | 3/2006 | Douglass et al. | |
| 7,024,283 B2 | 4/2006 | Bicknell | |
| 7,031,880 B1 | 4/2006 | Seem et al. | |
| 7,062,389 B2 | 6/2006 | Johnson et al. | |
| 7,068,391 B2 | 6/2006 | Tokunaga | |
| 7,069,181 B2 | 6/2006 | Jerg et al. | |
| 7,085,674 B2 | 8/2006 | Iwasawa | |
| 7,113,085 B2 | 9/2006 | Havekost | |
| 7,171,287 B2 | 1/2007 | Weiss | |
| 7,183,907 B2 | 2/2007 | Simon et al. | |
| 7,243,044 B2 | 7/2007 | McCalla | |
| 7,250,856 B2 | 7/2007 | Havekost et al. | |
| 7,272,452 B2 | 9/2007 | Coogan et al. | |
| 7,277,018 B2 | 10/2007 | Reyes et al. | |
| 7,320,023 B2 | 1/2008 | Chintalapati et al. | |
| 7,345,580 B2 | 3/2008 | Akamatsu et al. | |
| 7,379,997 B2 | 5/2008 | Ehlers et al. | |
| 7,457,869 B2 | 11/2008 | Kernan | |
| 7,460,020 B2 | 12/2008 | Reyes et al. | |
| 7,490,319 B2 | 2/2009 | Blackwell et al. | |
| 7,496,911 B2 | 2/2009 | Rowley et al. | |
| 7,565,225 B2 | 7/2009 | Dushane et al. | |
| 7,596,613 B2 | 9/2009 | Silverthorne et al. | |
| 7,644,371 B2 | 1/2010 | Robertson et al. | |
| 7,653,459 B2 | 1/2010 | Pouchak et al. | |
| 7,734,572 B2 | 6/2010 | Wiemeyer et al. | |
| 7,774,457 B1 | 8/2010 | Talwar et al. | |
| 7,819,334 B2 | 10/2010 | Pouchak et al. | |
| 7,826,929 B2 | 11/2010 | Wacker | |
| 7,870,090 B2 | 1/2011 | McCoy et al. | |
| 7,886,031 B1 * | 2/2011 | Taylor et al. | 709/221 |
| 7,904,186 B2 | 3/2011 | Mairs et al. | |
| 8,090,477 B1 | 1/2012 | Steinberg | |
| 8,112,162 B2 | 2/2012 | Pouchak et al. | |
| 8,190,273 B1 | 5/2012 | Federspiel et al. | |
| 8,218,570 B2 | 7/2012 | Moran et al. | |
| 8,224,466 B2 | 7/2012 | Wacker | |
| 8,224,763 B2 | 7/2012 | Guralnik et al. | |
| 8,224,888 B2 | 7/2012 | Brindle | |
| 8,239,500 B2 | 8/2012 | Pouchak | |
| 8,335,593 B2 | 12/2012 | Johnson et al. | |
| 8,352,047 B2 | 1/2013 | Walter | |
| 2002/0152298 A1 | 10/2002 | Kikta et al. | |
| 2003/0078677 A1 * | 4/2003 | Hull et al. | 700/1 |
| 2003/0101009 A1 | 5/2003 | Seem | |
| 2003/0171851 A1 | 9/2003 | Brickfield et al. | |
| 2004/0143510 A1 | 7/2004 | Haeberle et al. | |
| 2004/0230328 A1 | 11/2004 | Armstrong et al. | |
| 2005/0038571 A1 | 2/2005 | Brickfield et al. | |
| 2005/0043862 A1 | 2/2005 | Brickfield et al. | |
| 2005/0143863 A1 | 6/2005 | Ruane et al. | |
| 2005/0193285 A1 | 9/2005 | Jeon | |
| 2005/0203490 A1 | 9/2005 | Simonson | |
| 2005/0222889 A1 | 10/2005 | Lai et al. | |
| 2006/0038672 A1 | 2/2006 | Schoettle | |
| 2006/0064305 A1 | 3/2006 | Alonso | |
| 2006/0136558 A1 | 6/2006 | Sheehan et al. | |
| 2006/0168013 A1 | 7/2006 | Wilson et al. | |
| 2006/0253205 A1 | 11/2006 | Gardiner | |
| 2007/0198674 A1 | 8/2007 | Li et al. | |
| 2008/0010049 A1 | 1/2008 | Pouchak et al. | |
| 2008/0189162 A1 | 8/2008 | Ganong et al. | |
| 2009/0113037 A1 | 4/2009 | Pouchak | |
| 2010/0106543 A1 | 4/2010 | Marti | |
| 2010/0131653 A1 | 5/2010 | Dharwada et al. | |
| 2010/0131877 A1 | 5/2010 | Dharwada et al. | |
| 2010/0198651 A1 | 8/2010 | Johnson et al. | |
| 2010/0286937 A1 | 11/2010 | Hedley et al. | |
| 2011/0010654 A1 | 1/2011 | Raymond et al. | |
| 2011/0093493 A1 | 4/2011 | Nair et al. | |
| 2011/0098863 A1 | 4/2011 | Miki | |
| 2011/0113360 A1 | 5/2011 | Johnson et al. | |
| 2011/0196539 A1 | 8/2011 | Nair et al. | |
| 2011/0225580 A1 | 9/2011 | Nair et al. | |
| 2011/0298608 A1 | 12/2011 | Ranjan et al. | |
| 2011/0316688 A1 | 12/2011 | Ranjan et al. | |
| 2012/0005731 A1 | 1/2012 | Lei et al. | |
| 2012/0166992 A1 | 6/2012 | Huynh et al. | |

FOREIGN PATENT DOCUMENTS

| | | |
|---|---|---|
| WO | WO 03/090038 | 10/2003 |
| WO | WO 2004/053772 | 6/2004 |
| WO | WO 2004/055608 | 7/2004 |
| WO | WO 2004/070999 | 8/2004 |
| WO | WO 2005/020167 | 3/2005 |
| WO | WO 2006/048397 | 5/2006 |
| WO | WO 2007/024622 | 3/2007 |
| WO | WO 2007/024623 | 3/2007 |
| WO | WO 2007/027685 | 3/2007 |
| WO | WO 2007/082204 | 7/2007 |

OTHER PUBLICATIONS

Trane, "System Programming, Tracer Summit Version 14, BMTW-SVP01D-EN," 623 pages, 2002.
U.S. Appl. No. 12/895,609, filed Sep. 30, 2010.
U.S. Appl. No. 12/895,640, filed Sep. 30, 2010.
Tridium, "Tridium & Niagara Framework Overview," 9 pages, prior to Oct. 28, 2008.
Tridium, "NiagaraAX Product Model Overview," 7 pages, 2005.
Adobe Acrobat 6.0 Standard, Version 6.0.2, Screenshots, 2 pages, May 18, 2004.
Atere-Roberts et al., "Implementation of a Computerized Maintenance Management System for the City of Atlanta," 13 pages, Proceedings of the Water Environment Federation, Jan. 1, 2002.
Business Objects, Crystal Reports Acess, Format, and Integrate Data, 4 pages, Dec. 2003.
U.S. Appl. No. 13/402,780, filed Feb. 22, 2012.
U.S. Appl. No. 13/657,620, filed Oct. 22, 2012.
Honeywell Spyder Bacnet User's Guide, 242 pages, Revised Jul. 2009.
Honeywell Spyder User's Guide 202 pages, Released Jul. 2007.
Honeywell, "ComfortPoint Open BMS Release 100," Specification and Technical Data, 13 pages, Jun. 2012.
Honeywell, "Excel 15B W7760B Building Manager," User's Guide, 84 pages, Revised Jan. 2005.

(56) References Cited

OTHER PUBLICATIONS http://blogs.msdn.com/b/khen1234/archive/2005/05/11/416392.aspx, "Regular Expressions in T-SQL," 4 pages, May 11, 2005.

http://en.wikipedia.org/wiki/JAR_(file_format), "JAR (file Format)—Wikipedia, the Free Encyclopedia," 3 pages, printed Dec. 26, 2009.

http://www.de2m.com/DE2R_Technical.html, "Data Enabled Enterprise Repository (DE2R) Technical Overview," 4 pages, printed Mar. 8, 2013.

http://www.google.com/maps, "Google Maps, Pin Location," 1 page, prior to Nov. 21, 2008.

Johnson Controls, "Fx Workbench, User's Guide," 818 pages, issued May 19, 2008, (this article will be uploaded to USPTO website in 5 parts).

Microsoft Word Screen Shots, 2 pages, prior to Nov. 21, 2008.

Novar, "Opus Supervisor User Guide," pp. 1-159, Feb. 1, 2012.

Novar, "Demand Response, Program Implementation and Execution," 8 pages, Oct. 28, 2008.

Novar, "Media Backgrounder," 10 pages, prior to Feb. 22, 2012.

Siemens, BACnet for DESIGNO 27 Pages, prior to Dec. 30, 2009.

* cited by examiner

Niagara Workbench
File  Edit  Search  Bookmarks  Tools  Window  Px Viewer  Help
137.19.164.156 (OpusSupervisorStation)  Station (NovarSupervisor)  Home Nav
▸ My Network
+ My Host : OH34DT14Z6HD1
+ 10.190.11.106 ( lowes_site1_
+ 10.190.11.107 (Kohls_2310M
+ 10.190.11.5 ( HomeDepot_Sit
+ 10.190.11.51 (Kohls_3214Akr
+ 137.19.164.156 (OpusSuperv
+ null

111

NovarSupervisor

NOVAR

House  Alarm  History

Store List

| Customer | Store | City | State | IP | Port |
|---|---|---|---|---|---|
| Kohls | 11056 | SpringHill | TN | ip:10.45.140.244 | 1911 |
| Kohls | 10142 | Janesville | WI | ip:10.42.64.244 | 1911 |
| Kohls | 10105 | SiouxFalls | SD | ip:10.42.24.244 | 1911 |
| Kohls | 11225 | Richmond | KY | ip:10.45.149.244 | 1911 |
| Kohls | 11231 | Surprise | AZ | ip:10.45.152.244 | 1911 |
| Kohls | 11188 | BullheadCity | AZ | ip:10.45.142.244 | 1911 |
| Kohls | 10082 | WestBend | WI | ip:10.41.99.244 | 1911 |
| Lowes | 11213 | Lithonia | GA | ip:10.45.145.244 | 1911 |
| Lowes | 11224 | Grafton | WI | ip:10.45.158.244 | 1911 |
| Lowes | 11209 | PortCharlotte | FL | ip:10.45.144.244 | 1911 |
| Lowes | 11234 | Albany | GA | ip:10.45.153.244 | 1911 |
| Lowes | 11230 | Orlando | FL | ip:10.45.151.244 | 1911 |
| Lowes | 11207 | QueenCreek | AZ | ip:10.45.143.244 | 1911 |
| Lowes | 11286 | Oxford | AL | ip:10.45.166.244 | 1911 |
| Lowes | 11236 | Atascocita | TX | ip:10.45.161.244 | 1911 |
| Lowes | 11214 | Atlanta | GA | ip:10.45.146.244 | 1911 |
| Lowes | 10103 | Clive | IA | ip:10.42.20.244 | 1911 |
| Lowes | 11216 | Suffolk | VA | ip:10.45.147.244 | 1911 |
| Lowes | 11295 | Walton | KY | ip:10.45.168.244 | 1911 |
| Home Depot | 11279 | LeagueCity | TX | ip:10.45.165.244 | 1911 |
| Home Depot | 11292 | Snohomish | WA | ip:10.45.167.244 | 1911 |
| Home Depot | 11269 | FortMyers | FL | ip:10.45.163.244 | 1911 |
| Home Depot | 11275 | Katy | TX | ip:10.45.164.244 | 1911 |

SITE CONTROLLER DISCOVERY AND IMPORT SYSTEM

The present application is a Continuation-in-Part of U.S. patent application Ser. No. 12/260,046, filed Oct. 28, 2008, and entitled "A Building Management Configuration System". U.S. patent application Ser. No. 12/260,046, filed Oct. 28, 2008, is hereby incorporated by reference.

BACKGROUND

The present disclosure pertains to controllers and particularly to controller integration with a supervisor.

SUMMARY

The disclosure is about site controller discovery, import and integration. A customer may purchase site controllers from a seller to be put at its remote location, sometimes prior to a customer having network connectivity to the remote location. The seller may provide a site controller configuration to a field installer who puts it into the customer's site controller at the remote location. Eventually, the customer may want to integrate the remote site controller with a supervisor at its home facility. A limitation may be that the integration into the customer's home facility will need to be done manually, thus increasing error of data transfer. The present approach may provide site controller discovery, import and integration including automation of integration of the deployed site controller configuration and enterprise hierarchy into the home facility supervisor with very minimal user intervention. During the importing and integration into the customer's supervisor, enterprise model data may be retrieved and added to the existing multi-site hierarchal structure with the supervisor. Virtually all of the connection properties may be configured, and a deployed site controller file structure may be created to support backup and re-download. The import operation may also automatically perform a configuration backup to complete the integration process. The configuration in the deployed site controller or controllers may be considered the master configuration. Therefore, by importing the configuration data directly from the master source, one may ensure that the data transfer remains accurate.

BRIEF DESCRIPTION OF THE DRAWING

FIG. 9 is a screen diagram of a related art user application navigation view;

FIG. 34 is a diagram of a screen showing an alarm console view with alarms differentiated by the group, site and XCM names of where each alarm came from.

DESCRIPTION

The Novar™ Opus™ Supervisor is a target application of the present disclosure. A user of the Novar Opus Supervisor may manage and communicate with hundreds or thousands of remote site controllers from a centralized location via the users' intranet. These site controllers may be referred to as the XCM™ controller (XCM). The XCM in turn may manage and communicate with tens or hundreds of field controllers within the site, which perform real time control of building equipment such as HVAC units, lighting panels and refrigeration circuits.

Figure 1:
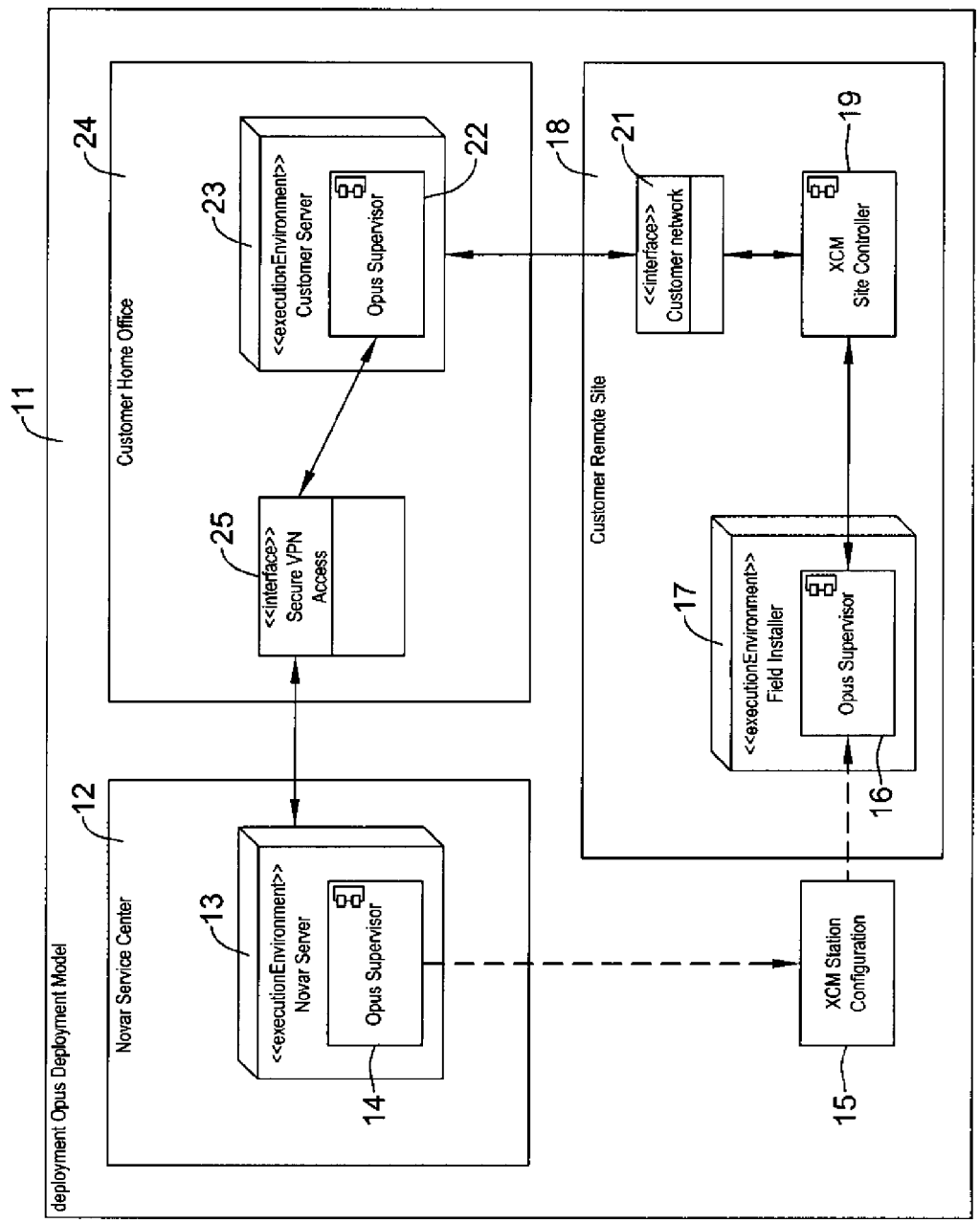
FIG. 1 is a diagram of a model of deployment architecture.

FIG. 1 is a diagram 11 of a model of an Opus deployment architecture. In summary, an original XCM site controller configuration may be created in the Novar Opus Supervisor, and then it may be emailed to a field installation technician where the configuration is directly loaded into the XCM site controller. Once the network connection is established, the Customer Opus Supervisor may utilize the import aspects indicated in the present disclosure to import and integrate the remote XCM into the supervisor.

A Novar service center 12 may incorporate a Novar server 13 for an execution environment. Within the server 13 may be an Opus Supervisor 14 with an output of an XCM station configuration 15 which goes to an Opus Supervisor 16 of a field installer 17 at a customer remote site 18. Opus Supervisor 16 may have a two-way connection with an XCM site controller 19, which in turn may have a similar connection with a customer network 21 interface at the customer remote site 18. The customer network 21 may have a two-way connection with an Opus Supervisor 22 of a customer's server 23 at a customer's home office 24. A similar connection may be between Supervisor 22 a secure VPN (virtual private network) access interface 25, which in turn provides a similar connection with the Novar server 13 of the Novar service center 12.

There are Opus customers who may purchase services from Novar to install, configure and commission the Opus systems into their remote sites. On new construction sites, many times it may be necessary to install and configure the XCM site controllers prior to a customer having network connectivity to the remote site. In this situation, Novar may create the XCM Site configuration and email the configuration to a field installer. The field installer may place the XCM site configuration on a personal laptop and install it directly into the XCM site controller. The XCM site configuration may now be in the XCM and can be used to control the site equipment during the startup of that facility. An issue may be that, once a network connection is established, the Opus Supervisor running at the customer's home office will need to integrate the deployed XCM site controller. Depending on the number of sites being commissioned, there could be multiple sites that need to be integrated with the customer's Opus Supervisor. This integration may be required to provide customer associates an ability to locate and navigate to the remote site controllers in order to monitor status and control conditions. Also, the integration may be necessary to support a collection of alarms and histories into the customer's Opus Supervisor. A limitation with the current system may be when the XCM station configuration is directly copied to the XCM site controller, the user will need to manually reconstruct the integration with the customer's home office Opus Supervisor. During this manual process, there may be a risk of the user entering incorrect data that does not match what is actually in the XCM site controller. Additionally, the time required to do this manual integration may be burdensome especially if there are multiple sites controllers that need to be integrated.

The Opus Supervisor may support a set of XCM import and integration aspects that will automate certain aspects of the integration of a deployed XCM site configuration into the Opus Supervisor.

A goal of the present disclosure is to provide a more efficient manner to import an XCM controller's configuration and enterprise hierarchy to the Opus Supervisor with and without user intervention. If user intervention is required, it should be minimal.

When an XCM site controller is imported and integrated into the Opus Supervisor, the XCMs Opus Enterprise Model Data may be retrieved from the XCM and added to the existing multi-group, multi-site hierarchal structure with the supervisor. Virtually all of the connection properties may be configured, and the deployed site/XCM file structure may be created to support the backup and re-download aspects. The import operation may also automatically perform a configuration backup to complete the integration process. In the Opus Systems, the configuration in the deployed XCM site controllers may be considered the master configuration. Therefore, by importing the configuration data directly from the master source, one may ensure that the data are accurate.

Advantages of the approach may include ease of use—menu based operation or background service, time saved—an auto integration of one or more XCM controllers' configuration and enterprise hierarchy to Opus Supervisor as opposed to manual integration, assurance of data consistency and integrity by synchronizing to the master source of the configuration data, and a support of an importing of deployed XCM controllers that were created and deployed with a standard Niagara™ workbench and do not contain the Opus Supervisor Enterprise model data.

The Opus supervisor and/or the Niagara workbench, for which the Opus supervisor is based upon, does not necessarily support auto import of deployed XCM controllers to the Opus supervisor. There may be an aspect that allows for discovery of other remote XCMs on the same Niagara network providing an easy method for adding to the supervisor's network. However, this does not necessarily integrate with the Opus Supervisor Enterprise structure or other automatic feature integration.

The Opus Supervisor may provide the user the ability to quickly and easily import and integrate the XCM controller's configuration and enterprise hierarchy by providing the following options. First, the user may invoke a menu option to import a single deployed XCM site configuration. Second, the user may invoke a menu option to discover multiple deployed XCM site configurations and select one or more detected and automatically import. Third, a user may configure a background service in the Opus Supervisor to detect a new Niagara Station that auto appears on the supervisor's Niagara Network and when detected, automatically imports without user interaction.

An import XCM Station selection on a screen may prompt the user for the specific host machine/IP address of the deployed XCM site controller from where the configuration is to be imported. After entering the credentials and port that particular site will be imported to, and the Opus Supervisor Enterprise Model hierarchy to be available in the supervisor navigation tree is noted, the following internal operations may be performed. A check may be made to determine if the enterprise hierarchy already exists in the remote site. If so, import it into the Supervisor navigation tree, or otherwise request the user to specifically enter the group/site/XCM name and other properties, and then complete import. A configured Niagara network setup may be added for the remote XCM. The file structure may be created to support the site XCM controller backup and re-download aspects. The station configuration may be copied to the Opus Supervisor, and a backup of the configuration be performed.

Figure 2:
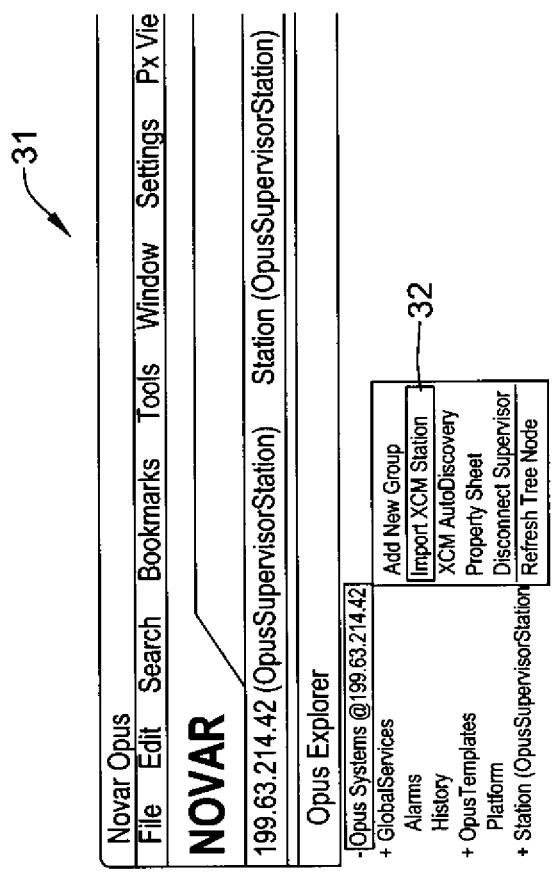
FIGS. 2, 3 and 4 are diagrams of an import site controller station approach.
Figure 3:
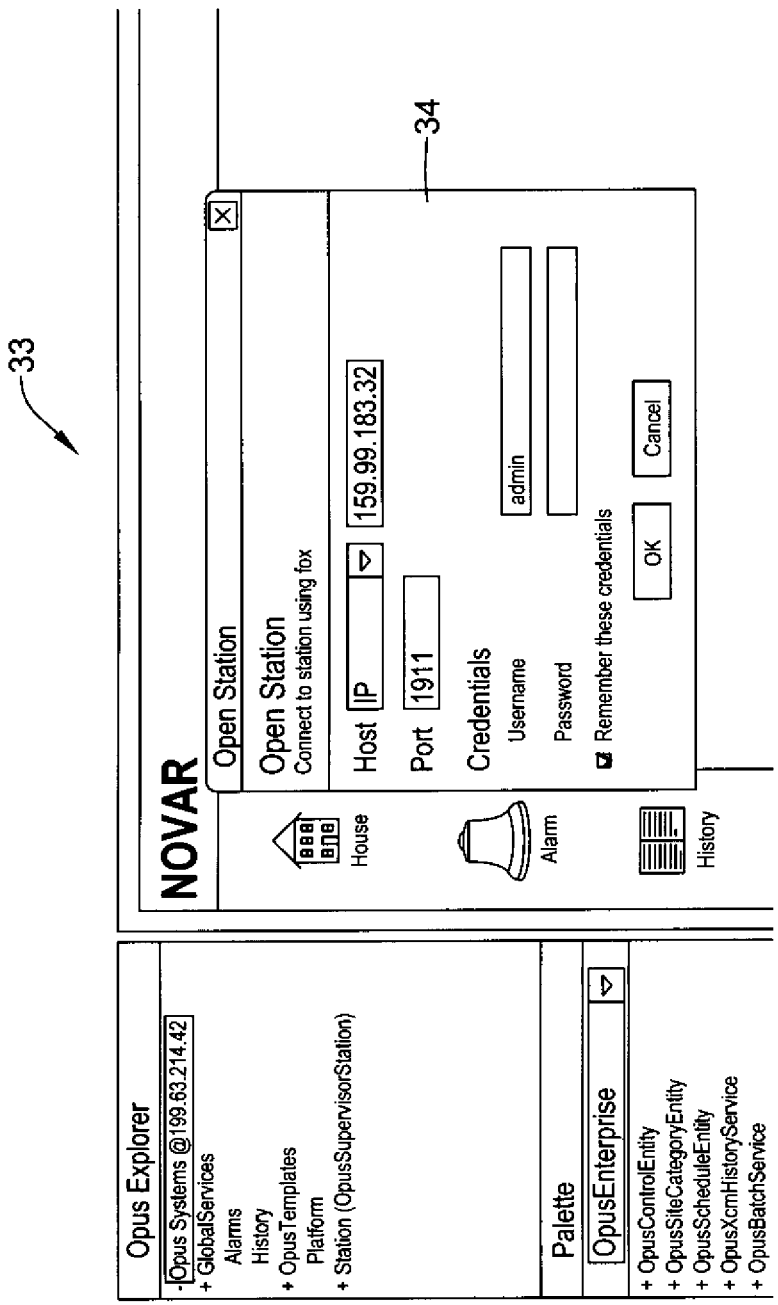
Figure 4:
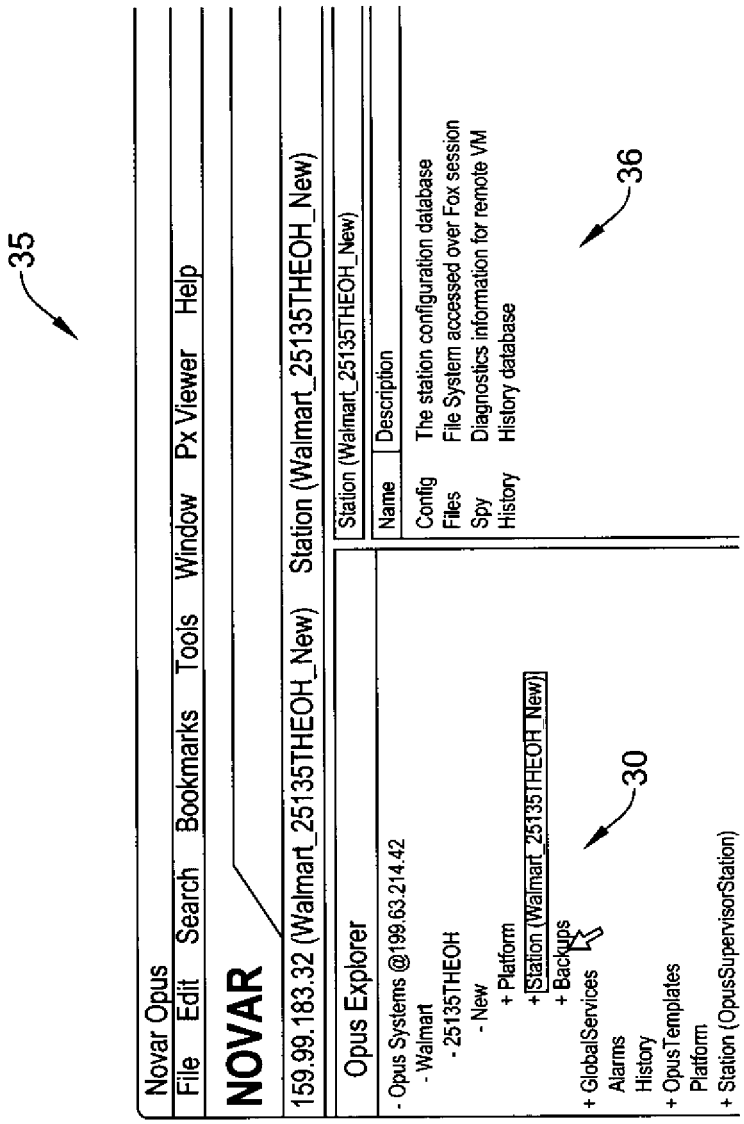

FIGS. 2, 3 and 4 are diagrams of the import XCM Station approach. FIG. 2 is a diagram showing a Novar screen 31 of a selected Opus Supervisor station at "199.63.214.42". The screen shows a menu 32 with an import XCM station selection being available. FIG. 3 shows the screen 33 with an open station box 34 for opening a station upon entry of certain information such as host, port and credentials. FIG. 4 shows a screen 35 with a customer XCM station opened having information about the station shown in portion 36 of the screen 35. The appearance of the XCM station in the Opus explorer tree hierarchy 30 in the left pane of screen 35 may be the end result of the manually invoked XCM import. This structure had not necessarily existed prior to the import.

An XCM auto discovery service for multi-XCMs may be noted. A user may be provided an XCM Auto Discovery menu option which when invoked results in an occurrence of a following operation. To start, the Opus Supervisor may scan the Niagara discovery to locate all stations within the local area network and provide the user a list of remote XCM site controllers found on the network that do not currently exist in the supervisor. Then the user may select the desired XCM site controllers to be imported. Each of the multiple sites selected by the user may be imported to the Opus Supervisor as described for the XCM station import herein.

Figure 5:
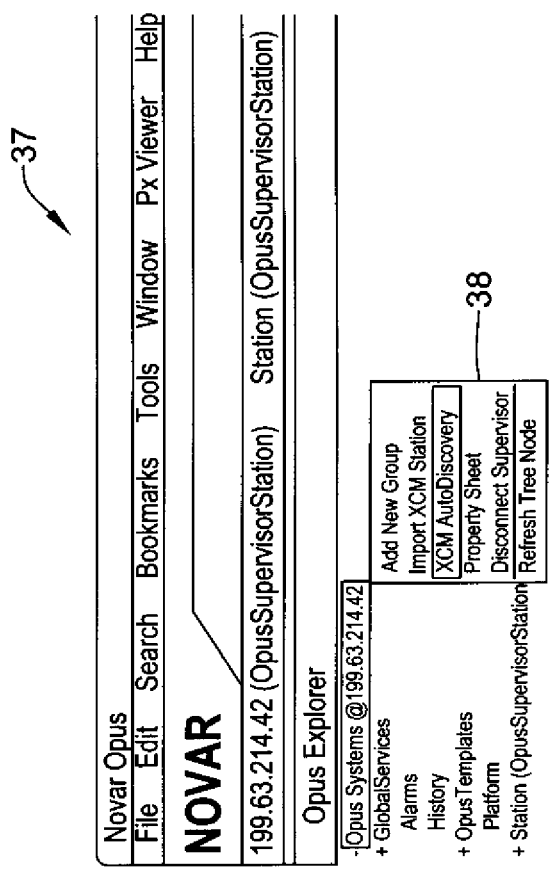
FIGS. 5, 6 and 7 are diagrams illustrating an approach for site controller auto discovery service.
Figure 6:
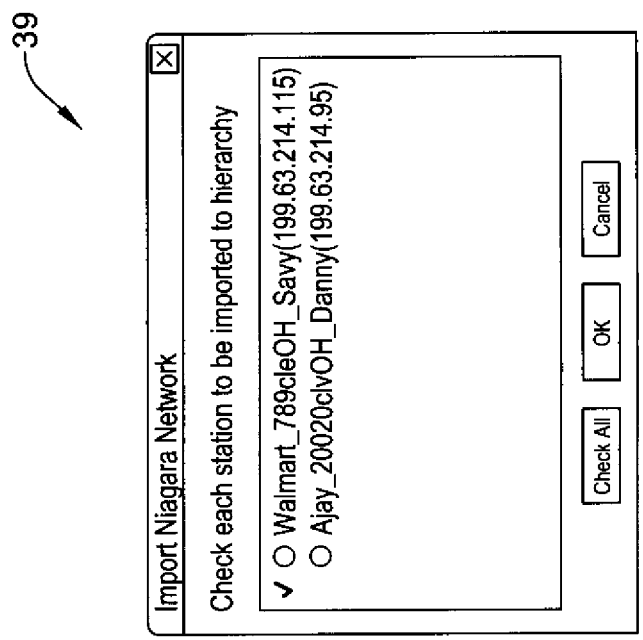
Figure 7:
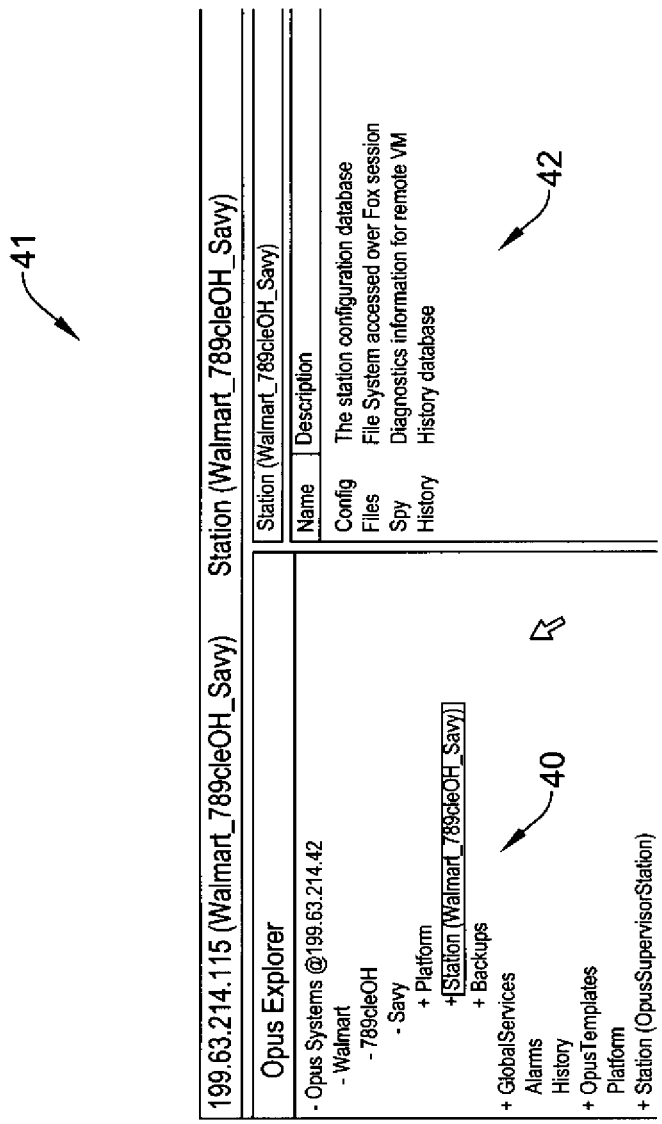

FIGS. 5, 6 and 7 illustrate the approach for XCM auto discovery service. FIG. 5 shows the Novar screen 37 of the selected Opus Supervisor station at "199.63.214.42". The screen shows a menu 38 with an XCM AutoDiscovery selection being available. The selection may lead to an import Niagara network menu 39 shown in FIG. 6 with a list of stations. One or more stations to be imported to a hierarchy may be checked with a mark to the left. A customer XCM station may be selected resulting in a screen 41 shown in FIG. 7. A right portion 42 of the screen may show selectable information related to the selected station. Such information may be the station configuration database, the file system accessed, diagnostics information and a history database. The appearance of the XCM station in the Opus Explorer tree hierarchy 40 in the left pane may be the end result of XCM imports just performed. This structure had not necessarily existed prior to the import.

An XCM auto discovery background service may be sought. The XCM auto discovery service may monitor the Niagara network and the navigation tree of Opus Supervisor to determine if a new Niagara station entry appears in the supervisors local area network. If a new site is detected, the XCM auto discovery service may automatically import those sites into the Opus Supervisor without user intervention. The import of each of the XCM site configuration may be as described for the XCM station import herein.

Figure 8:
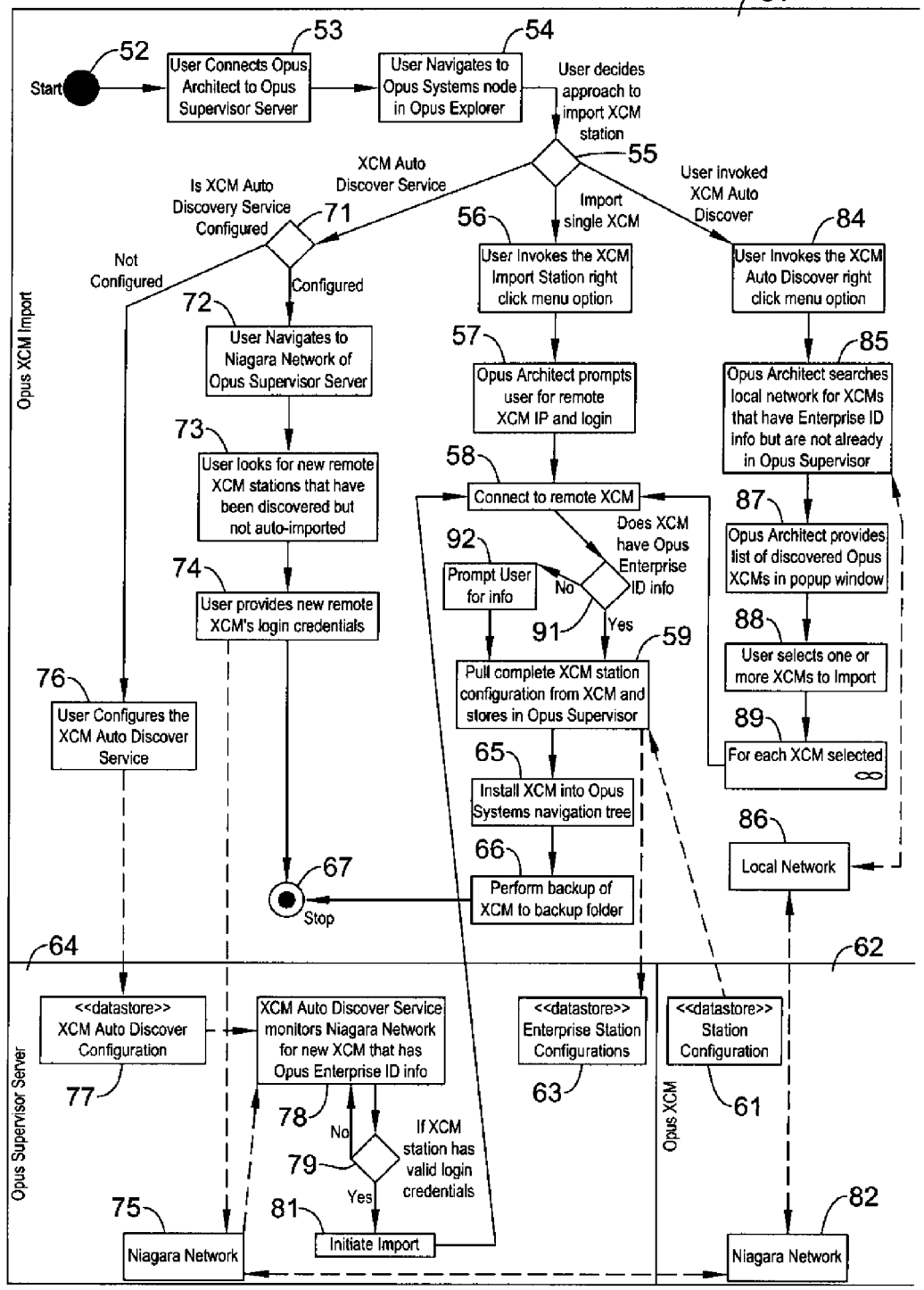
FIG. 8 is a flow diagram of XCM site controller discovery and import approaches.

FIG. 8 is a flow diagram 51 of generally all available Opus XCM discovery and import approaches. From a start at symbol 52, a user may connect an Opus Architect to an Opus Supervisor server at symbol 53. At symbol 54, the user may navigate to an Opus Systems node in Opus Explorer. A question of which approach a user decides to import an XCM station may be asked at symbol 55. The approaches may incorporate an XCM auto discovery service, a user invoked import of a single XCM, and a user invoked XCM auto discovery.

The import of a single XCM approach may lead to a user invoking an XCM import station right click menu option at symbol 56. The Opus Architect may prompt the user for a remote XCM IP and login at symbol 57. At symbol 58, a connection to a remote XCM may occur. Prior to pulling in the complete XCM station configuration, a question at symbol 91, whether the XCM has Opus Enterprise model (ID) information may be asked. If the answer is yes, the import may proceed by going on to symbol 59. If the answer is no, then the user may be prompted with a popup to get the information at symbol 92, and then proceed on to symbol 59. At symbol 59, a complete XCM station configuration may be pulled from a data store at symbol 61 of the Opus XCM represented by a block 62. The Opus XCM may be stored in a data store at symbol 63 of the Opus Supervisor represented by a block 64. Then the XCM may be installed into an Opus systems navigation tree at symbol 65. At symbol 66, a backup of the XCM to a backup folder may be performed before stopping at symbol 67.

The approach of the XCM auto discovery service may lead to a question of whether the XCM auto discovery service is configured or not at symbol 71. If the answer is configured, then the user may navigate to a Niagara network of the Opus Supervisor server at symbol 72. At symbol 73, the user may look for new remote XCM stations that have been discovered but not auto-imported. The user may provide new remote XCM's login credentials at symbol 74. The credentials may be provided to a Niagara network at symbol 75. Niagara network at symbol 75 of the Opus Supervisor server at block 64 may be interconnected with a Niagara network 82 of Opus XCM at block 62. From symbol 74, the approach for the XCM Auto discovery service configured may stop at symbol 67. "XCMs" may mean more than one XCM.

"XCM's" may be a possessive form of XCM or mean more than one XCM.

If the answer is not configured, then the user may configure the XCM auto discovery service at symbol 76. The XCM auto discovery configuration may be stored in a data store at symbol 77 in block 64 representing the Opus Supervisor server. Data from the configuration at symbol 77 may go to a symbol 78 where the XCM auto discovery service may monitor a Niagara network at symbol 75 for a new XCM that has Opus Enterprise ID information. At symbol 79, a question asked is whether the XCM station has valid login credentials. If not, then a return to symbol 78 may occur. If yes, then an XCM import may be initiated at symbol 81. Then a connection to a remote XCM may be at symbol 58 in block 51. Since this approach may have the Opus Enterprise model information upon reaching symbol 91 asking if the XCM has the Opus Enterprise ID information, the prompt at symbol 92 will not necessarily be needed, and the import may proceed on at symbol 59. At symbol 59, a complete XCM station configuration may be pulled from the data store at symbol 61 of the Opus XCM in block 62, and stored in the data store at symbol 63 of the Opus Supervisor in block 64. Then the XCM may be installed into an Opus Systems navigation tree at symbol 65. At symbol 66, a backup of the XCM to a backup folder may be performed before stopping at symbol 67.

The user invoked XCM auto discovery approach may lead to a user invoking the XCM auto discovery right click menu option at symbol 84. At symbol 85, the Opus Architect may search the local area network for XCMs have Opus Enterprise model (ID) information but are not already in the Opus Supervisor. The Opus Architect may provide a list of discovered XCMs in a popup window at symbol 87. At symbol 88, the user may select one or more XCMs to import. For each XCM selected at symbol 89, a connection may be made to a (remote) XCM at symbol 58. Since this approach may have the Opus Enterprise model information upon reaching symbol 91 asking if the XCM has the Opus Enterprise ID information, the prompt at symbol 92 will not necessarily be needed, and the import may proceed on at symbol 59. At symbol 59, a complete XCM station configuration may be pulled from the data store at symbol 61 of the Opus XCM in block 62, and stored in the data store at symbol 63 of the Opus Supervisor in block 64. Then the XCM may be installed into an Opus Systems navigation tree at symbol 65. At symbol 66, a backup of the XCM to a backup folder may be performed before stopping at symbol 67.

Some of the terms utilized herein may have corresponding designations as noted in the following: XCM station—site controller configuration; XCM auto discover service—site controller auto discovery service; XCM—site controller; Opus XCM—site controller; Opus workbench—user interface (console); Opus systems—enterprise site controllers (multi-site); Opus supervisor station—supervisor data server; Opus supervisor server—supervisor data server; Opus supervisor—supervisor; Opus group—site groups; Opus explorer—site navigation tree; Opus architect client—user interface (console); Opus architect—user interface (console); Opus—building management system (BMS); Niagara workbench—user interface (console); Niagara network—communication network; enterprise components—enterprise hierarchal elements; and enterprise—enterprise (business or customer) building site locations (all multi-site).

There may a way for providing a user an approach to create, deploy and manage separate control system entities within a hierarchical context of a multi-business and/or multi-site environment. This approach may be incorporated into an architecture having one or more workstations, controllers, servers, and so forth.

The Tridium Niagara™ AX framework is the base application framework to develop the multi-business/multi-site application that is described herein. The related art implementation of Niagara™ AX is to provide configuration, control and monitoring of embedded DDC (direct digital control) controllers within the context of a single executive level JACE™. JACE may refer to "Java application and control engine". Each JACE contains references to subordinate embedded field controllers within its respective network to perform the specified control functions. JACE and its subordinates may be referred to as the "control system" entity. This described control system may typically be deployed within a single geographical site. However, a site may have multiple control systems.

A Niagara™ AX supervisor application may be deployed providing the user interface and a runtime environment providing some supervisory control level capabilities for multiple control systems accessible within a supervisor's network. A supervisor may collect alarms and historical logs from multiple deployed control systems to be viewed by a user of the supervisor application. Each JACE executive controller may be configured to communicate with this supervisor application as needed.

An issue may be noted in the following. Within the related art, the Niagara™ AX user application experience, each control system entity may be managed as an independent entity with the JACE being the highest level contextual entity. The supervisor application is limited to manage the multiple control systems within a single, flat hierarchal list of control system entities. By default, the user application provides limited means to manage these control system entities within a context that matches the user's logical, multi-site deployment environment. If a user's business has hundreds or thousands of sites, they would need to manage these sites in a single linear list with business and site identification embedded in the naming of the individual control system entity. A user may also have multiple business groups that have hundreds or thousands of sites. Managing a large list of un-related business control system entities may be difficult for the user to do. The supervisor application may also collect alarms and data trend logs from these thousands of sites. The historical logs may be persisted into storage and be accessible for viewing by the supervisor. Without the customer and site context attached to these historical data points, the analysis of where an alarm or data log originated may be difficult for the user.

A solution of the present system is to provide the user the ability to create, deploy and manage these separate control system entities within the logical context of the user's multi-business and/or multi-site enterprise environment. A typical business may have hundreds or even thousands of sites with each site generally having from one to five control system entities. The present application may provide the user the means to create and manage each of the deployed control system entities in a user definable hierarchal structure in order to maintain and access the control system entities within their proper business and geographical context.

The enterprise model components of business, site and executive may be created as entity objects to represent each logical hierarchal level required for the user's environment. These new components may be created and managed within a supervisor application. The user may be provided properties associated with each of these components to personalize the specific business, site and control system entities. The new user application may provide a navigation and menu system to add, change or delete these components. At the end leaf of the enterprise model, the user may create an executive controller which may be a baseline Niagara™ AX JACE station configuration. This station may be the control system configuration file to be deployed to the control system at the site. When the control system configuration file is deployed to the site control system, the enterprise model components specific to that control system may also be downloaded into the controller. This may enable the controller to associate the enterprise context to historical alarms and trend logs that are pushed or polled to a runtime supervisor application.

The user application may provide an explorer type tree menu allowing the user to create and manage a personalized list of business groups, site lists and control system (i.e., executive) lists. Also, a navigation table view may be provided to allow the customer to browse its business, site and control systems. The application may provide the user other management features.

The present solution may allow the user to build an enterprise structure in accordance with the hierarchal entity relationships of the actual businesses the user manages. The user may have a business group that contains one or more sites. The site entity may contain one or more executive controllers (i.e., site controllers).

The present description may utilize screen diagrams to convey a concern with the existing user interface application management of multiple businesses, sites and executives and how the present software application enhances the user's ability to manage these entities. The "existing user" application refers to the related art application that needs the solution that the present approach is based on. A "new user" or "present" application refers to the solution stated herein.

FIG. 9 is a screen diagram of an "existing user" application navigation view. Both the left side navigation tree view 111 and the main window table view 112 provide flat lists of businesses, sites and executives.

Figure 10:
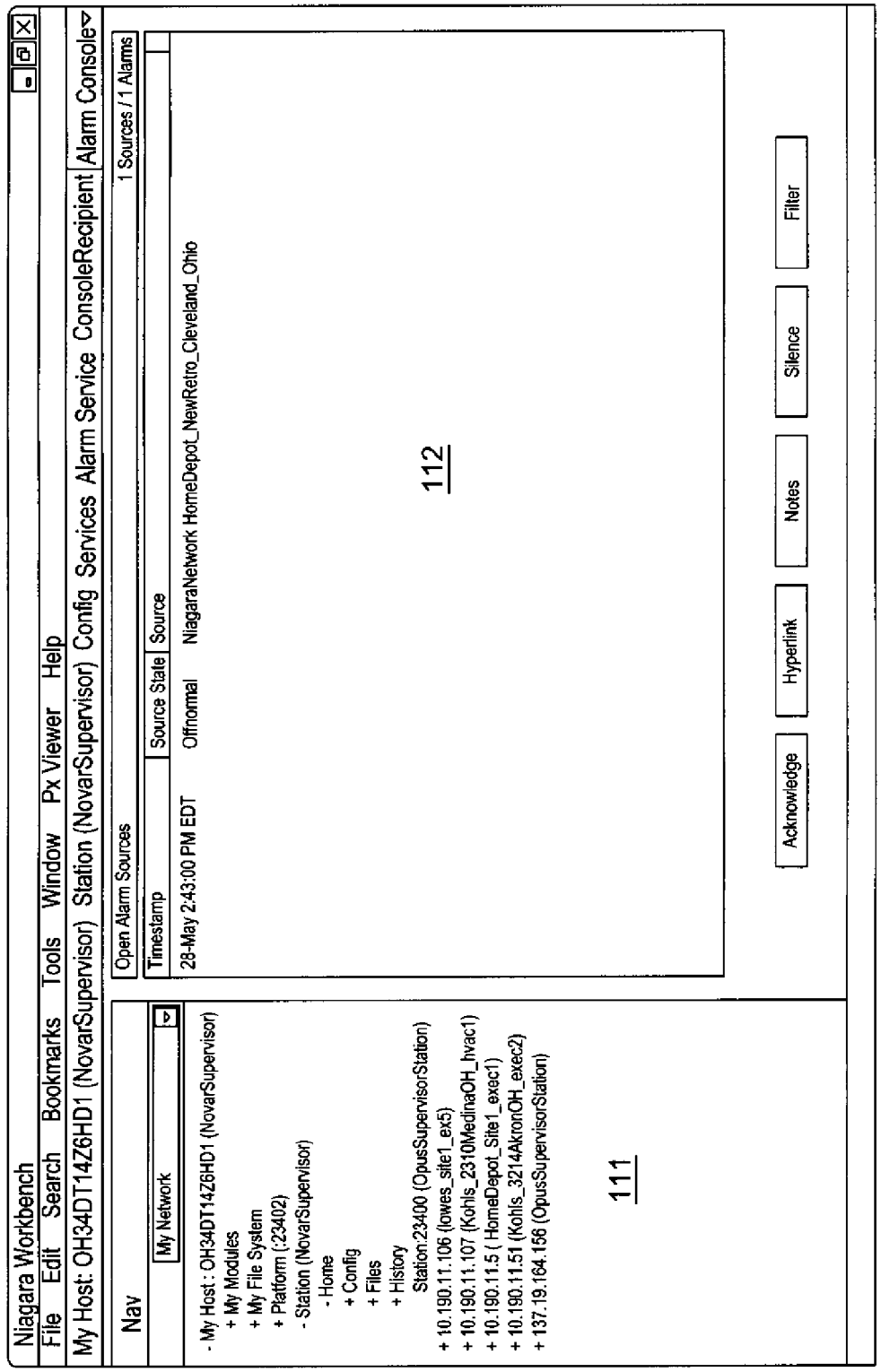
FIG. 10 is a screen diagram of a related art user application alarm view.

FIG. 10 is a screen diagram of an existing user application alarm in view 112. The existing application allows the user to view virtually all alarms collected in the supervisor (Niagara AX) from the deployed executives from the business sites. The business, site and executive information in view 112 is only embedded into the source JACE station name by the best practices of user.

Figure 11:
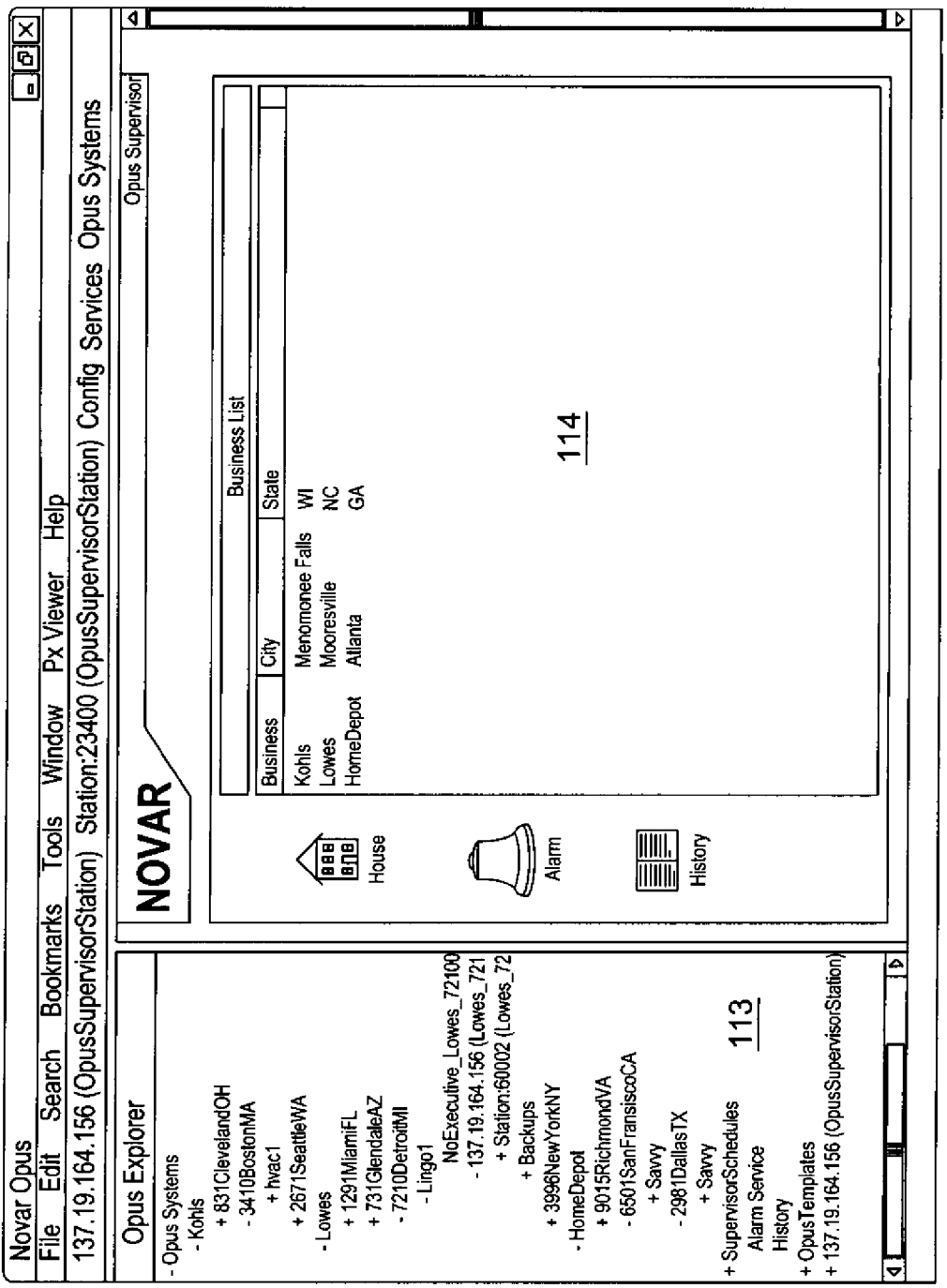
FIG. 11 is a screen diagram of a present user application showing multiple businesses.

FIG. 11 is a screen diagram of a "new user" application showing multiple businesses. By creating a business, site and executive entity component model, the new user application may provide extended features that could not be easily managed without these components. Hierarchal views of the user's enterprise may now easily be developed allowing quicker access to information about a site executive of interest. Such a view provides the top level list of businesses the user manages. The left navigation tree in view 113 and the main window table in view 114 may allow for navigation in a hierarchal manner. The business entities or groups are at the top level. This provides a logical starting point for user access. View 113 shows the explorer and view 114 shows the supervisor's navigation table.

Figure 12:
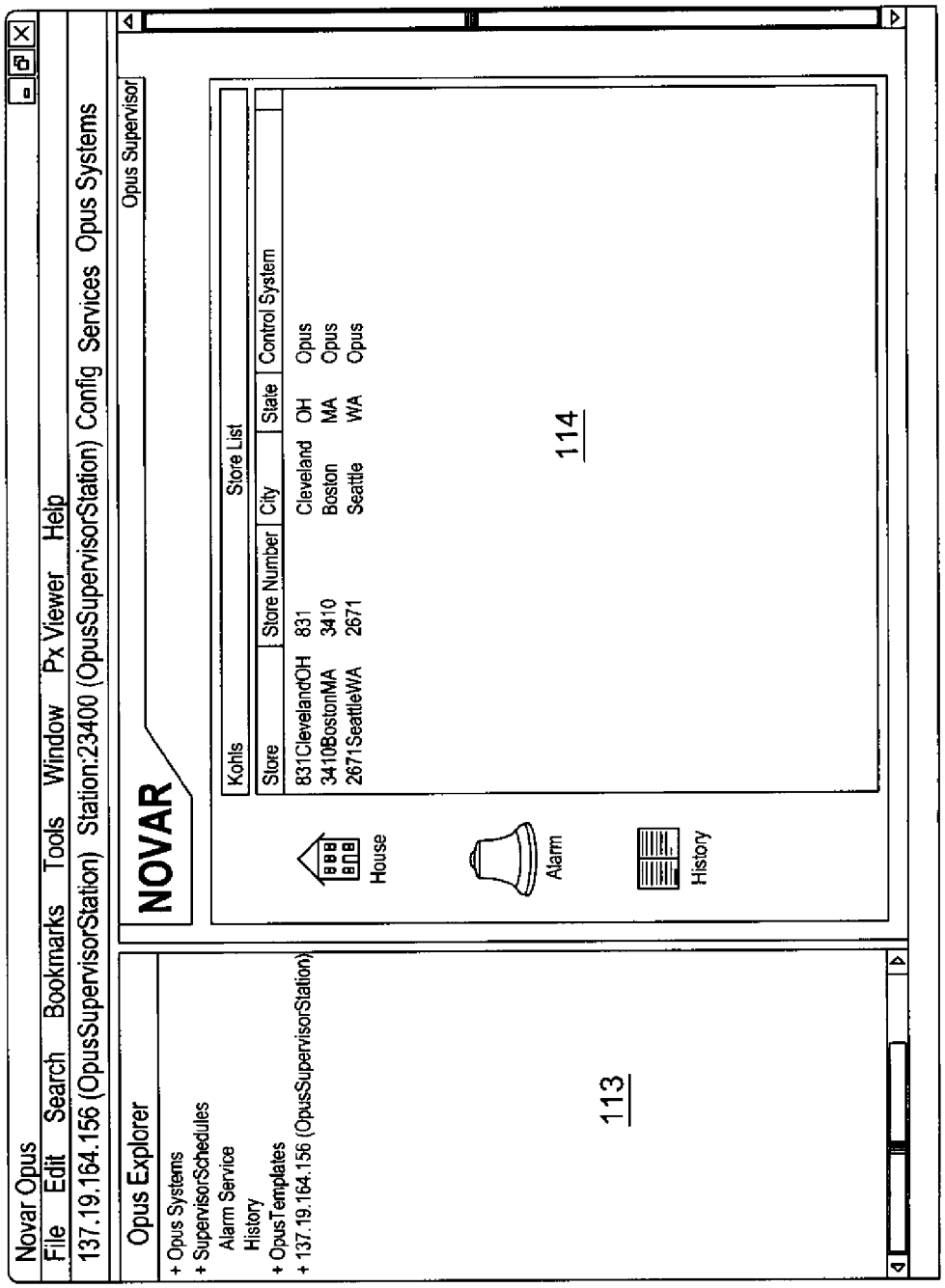
FIG. 12 is a screen diagram of a present user application showing multiple sites.

FIG. 12 is a screen diagram of the new user application showing multiple sites. This is the second screen in the enterprise model hierarchy and is rendered when the user selected a business in the previous screen. This just shows those sites that have been created and/or deployed for that business. This is the specified business site list in view 114. Advanced filtering and/or sorting algorithms may be developed relative to these enterprise model components based on a combination of properties.

Figure 13:
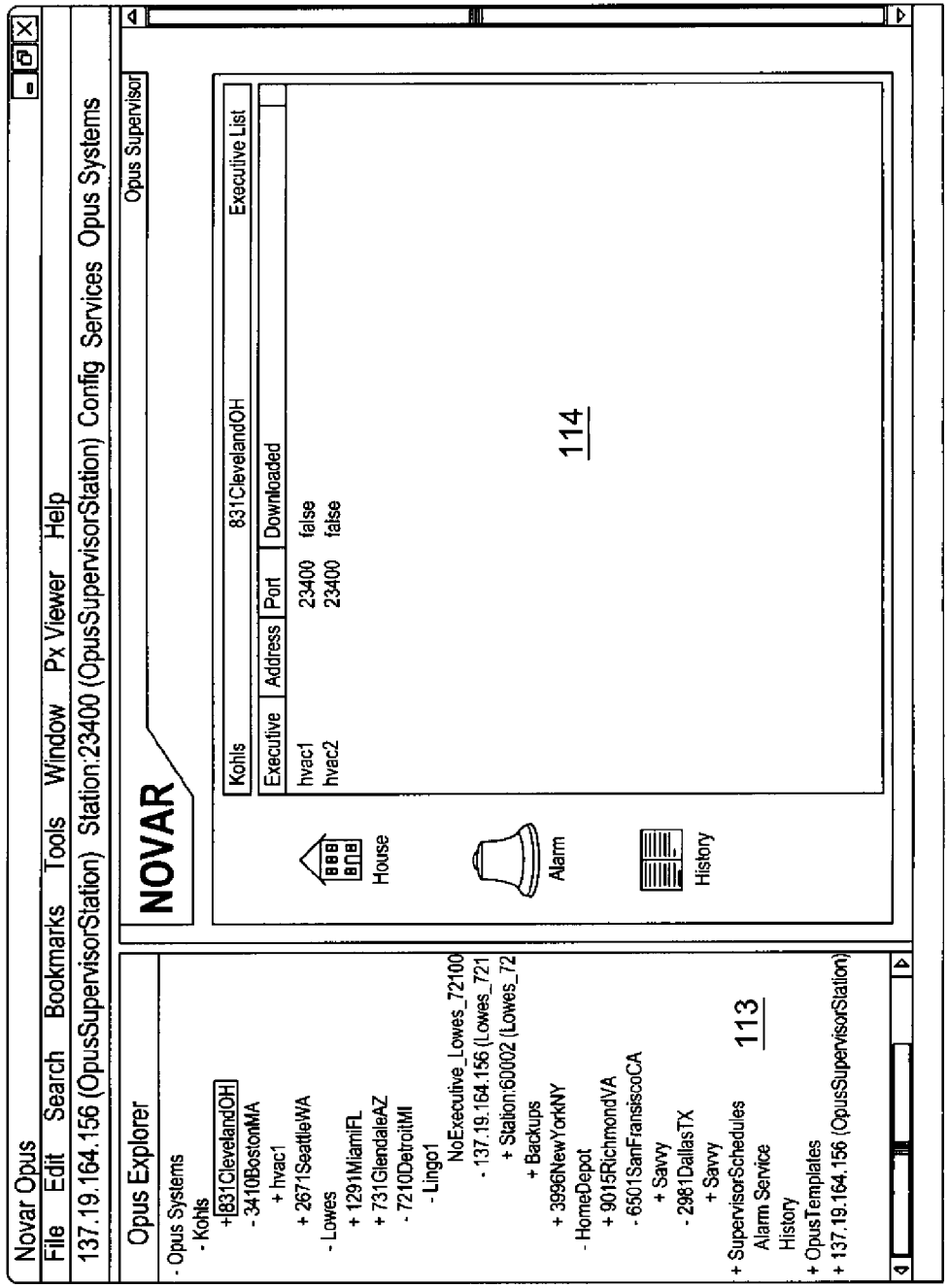
FIG. 13 is a screen diagram of a present user application showing multiple executives.

FIG. 13 is a screen diagram of a new user application showing multiple executives in view 114. This is the third screen in the enterprise model hierarchy and is rendered when the user has selected a site in the previous screen. This just shows those executives that have been created and/or deployed for that site. This may be the specified site controller list. Both the left navigation view 113 and the main table view 14 are navigation paths for connecting to the deployed executive controllers.

Figure 14:
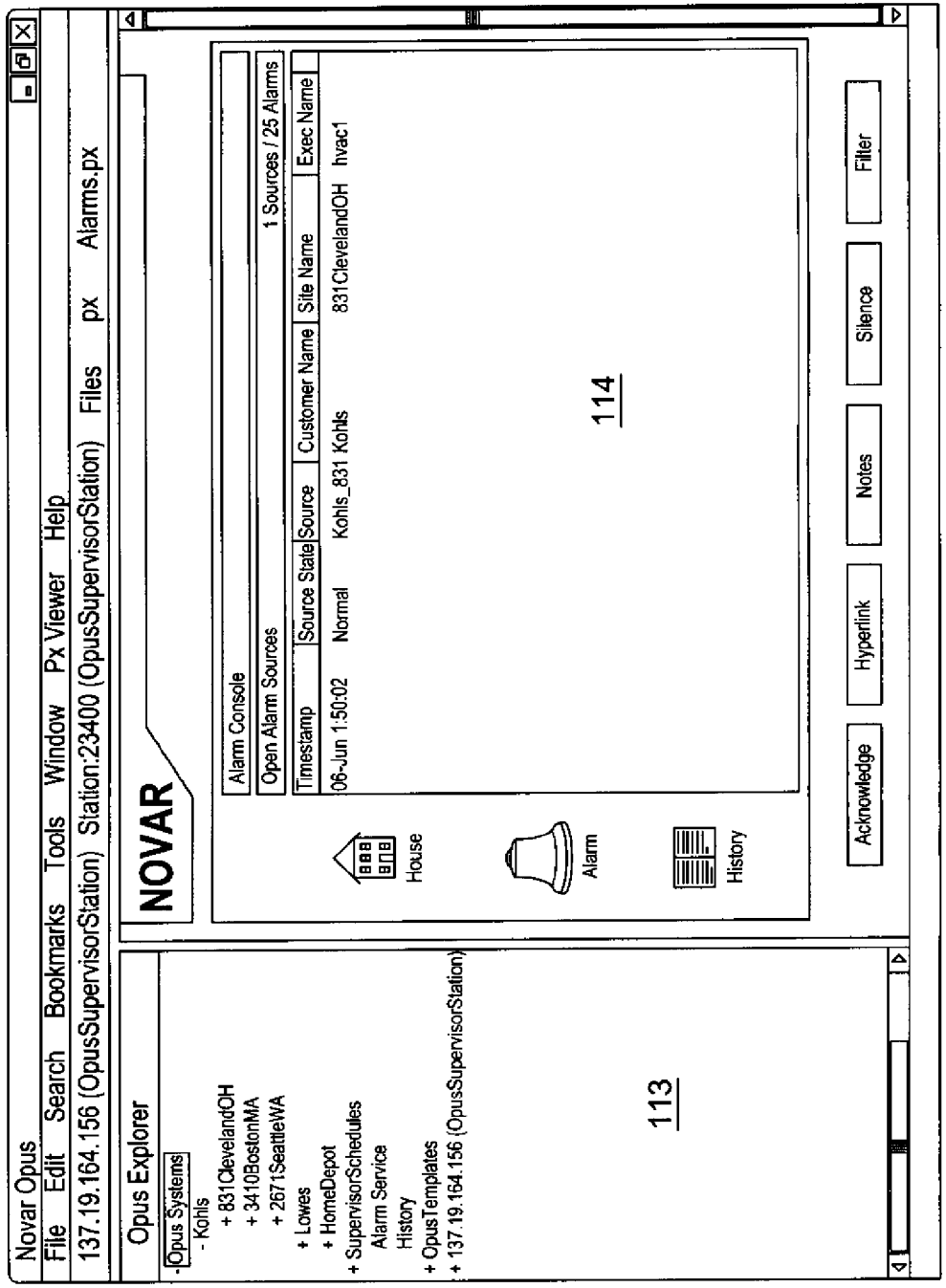
FIG. 14 is a screen diagram of a present user application alarm view.

FIG. 14 is a screen diagram of a new user application alarm list view. The new application provides this alarm list in view 114 with the enterprise model entity names separated out as independent properties of the alarms. Using the common enterprise model entity names enforces consistency as opposed to user best practice to name the source stations appropriately for each deployed executive. Sorting and filtering may now be achieved against these independent properties.

Figure 15:
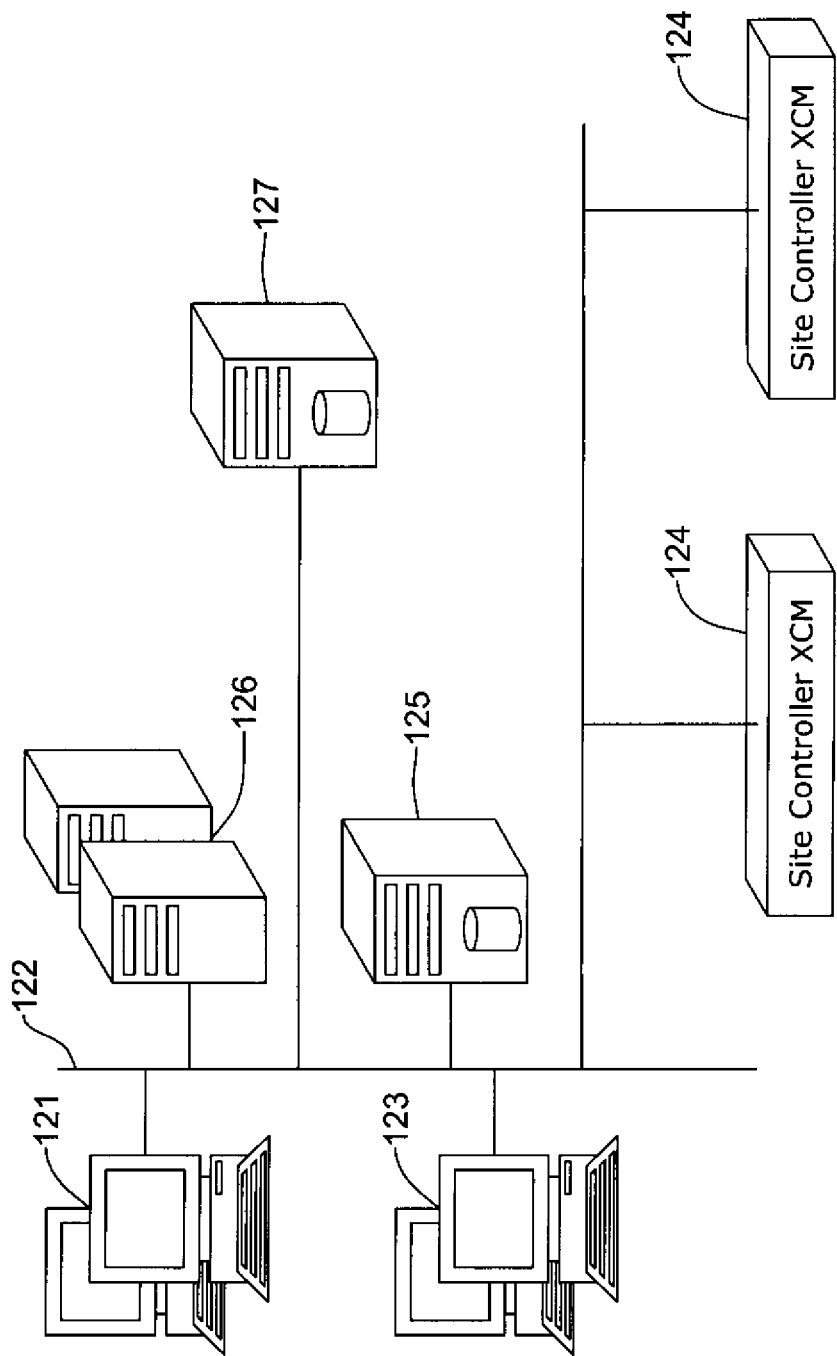
FIG. 15 is diagram of a deployment architecture overview of the present system.

FIG. 15 is diagram of a deployment architecture overview of the present system. A user workstation 121 may be connected to a bus 122. A supervisor client application may be on workstation 121. The application may be used for site creation, configuration, deployment and monitoring. There may be one or more site controllers (XCMs—executive control modules) 124 connected to bus 122. There may be thin client browser 123 access for runtime monitoring of deployed site controllers.

A supervisor server 125 may be connected to bus 122. Server 125 may provide multi user access for both thick and thin client users. It may maintain a database of enterprise hierarchy components. Server 125 may provide an environment for deployment, backup and restore for site controllers. It may provide navigational access to deployed site controllers and provide supervisory functions such as global schedules. Provisioning services may also be provided for enterprise wide updates. Further, the server 125 may provide alarm and log collection. Optionally, a separate supervisor server 126 may be connected to bus 122 to provide for the alarm and log collection. An optional, MS-SQL database server 127 may be connected to bus 122 used for persisting alarms, logs and other configuration items.

Figure 16:
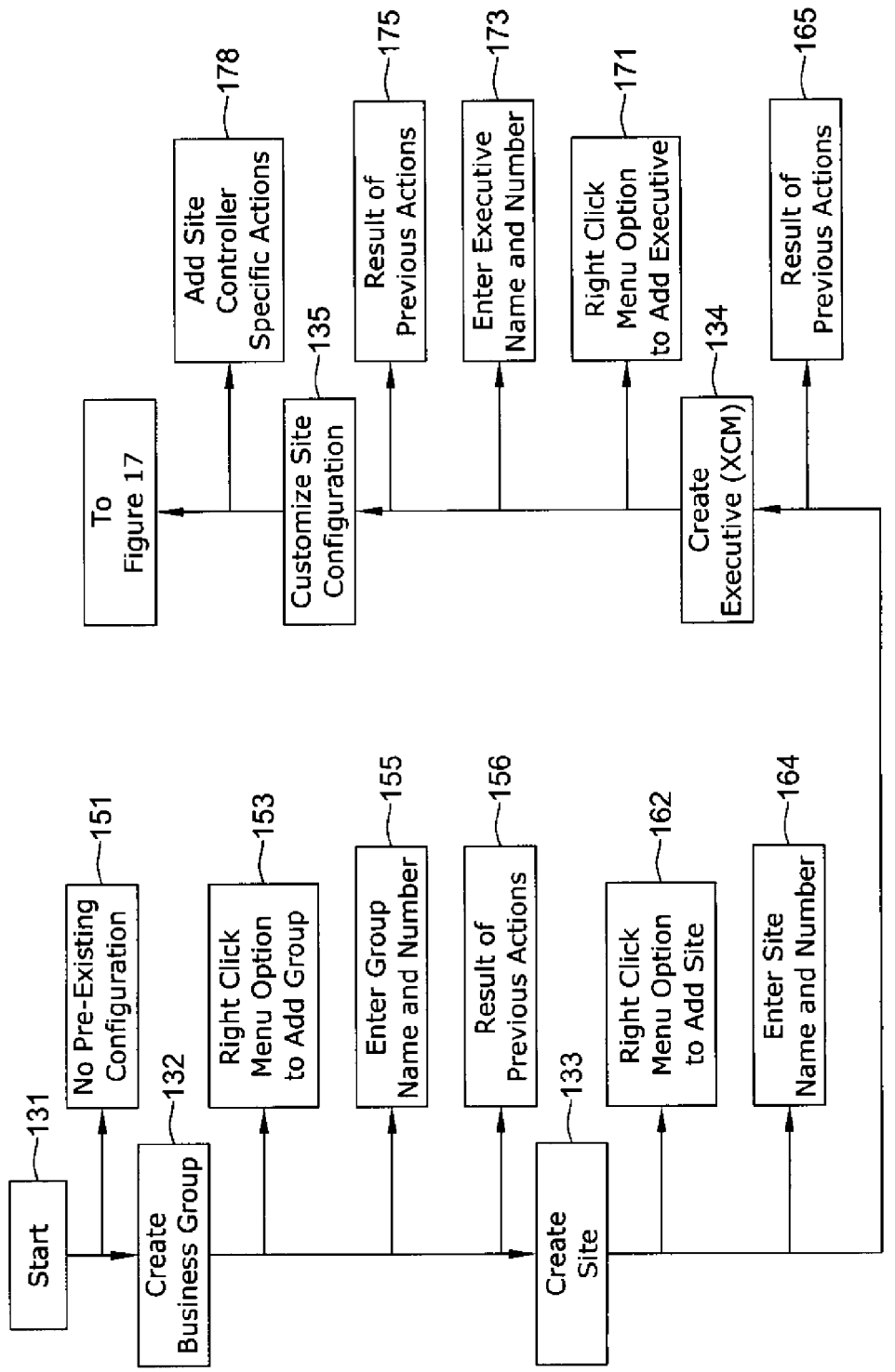
FIGS. 16 and 17 are diagrams of system configuration, site controller deployment, and runtime activities.
Figure 17:
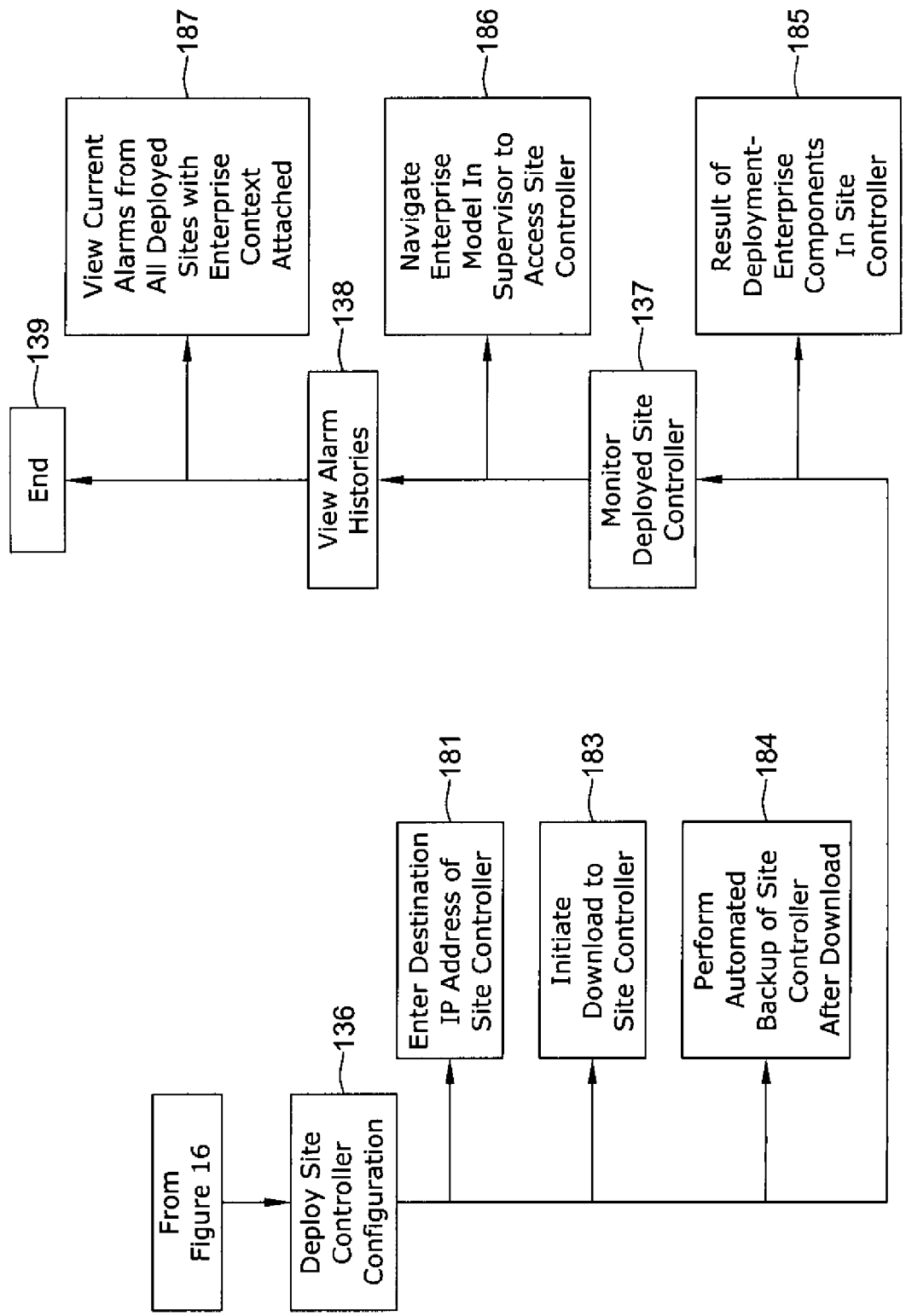
Figure 18:
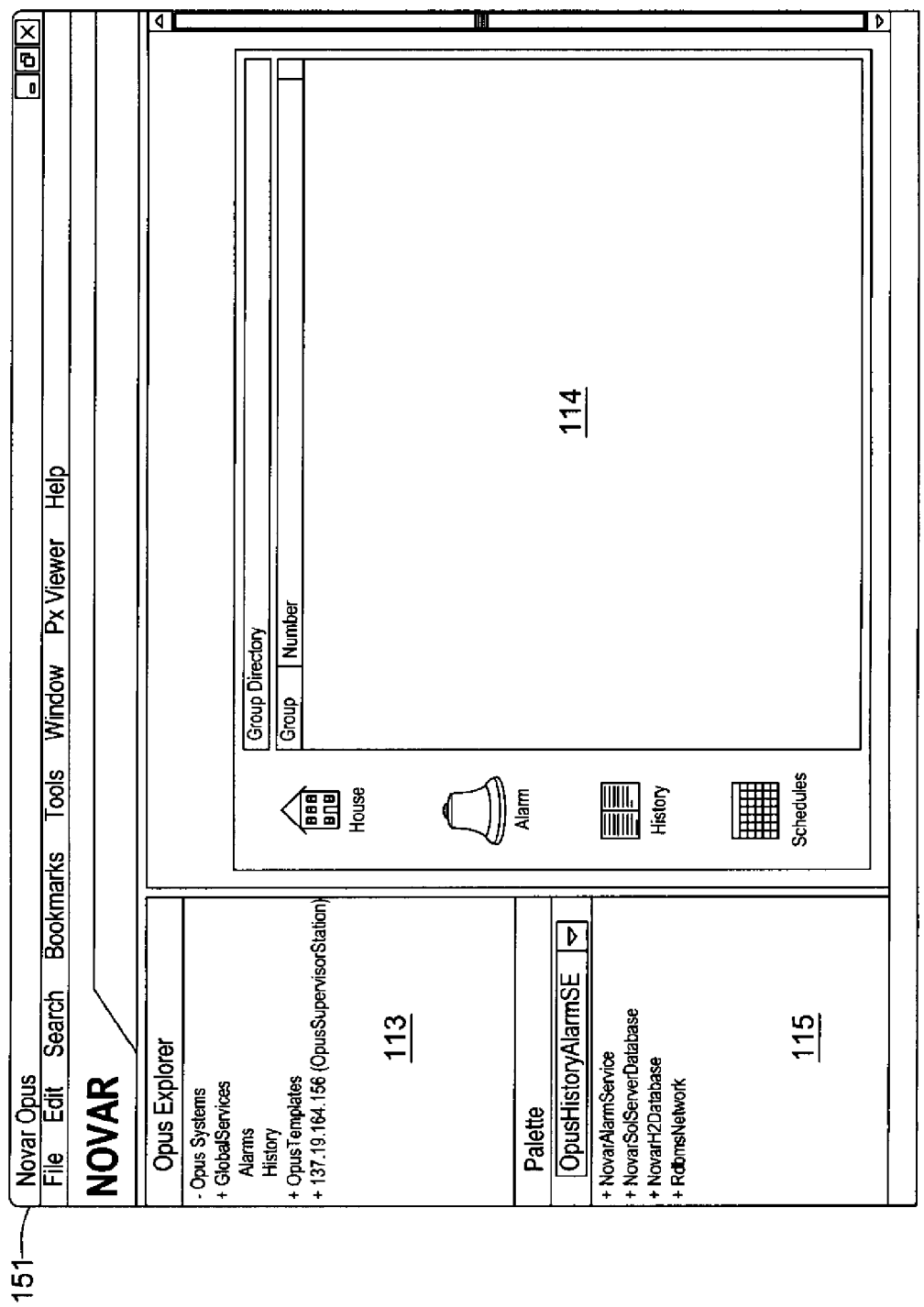
FIG. 18 is a diagram of a screen showing no pre-existing configuration.

FIGS. 16 and 17 are diagrams of system configuration, site controller deployment, and runtime activities. The present management system may be used to create the enterprise component hierarchy, create the site controller "offline" to be configured for site specific needs and then finally to download that site controller configuration from the supervisor to the remote site controller. At a start 131, there is no pre-existing configuration as may be shown in screen 151 of FIG. 18. Incidentally, FIG. 18 shows a palette in a view 115 to be used for later configuration activities.

Figure 19:
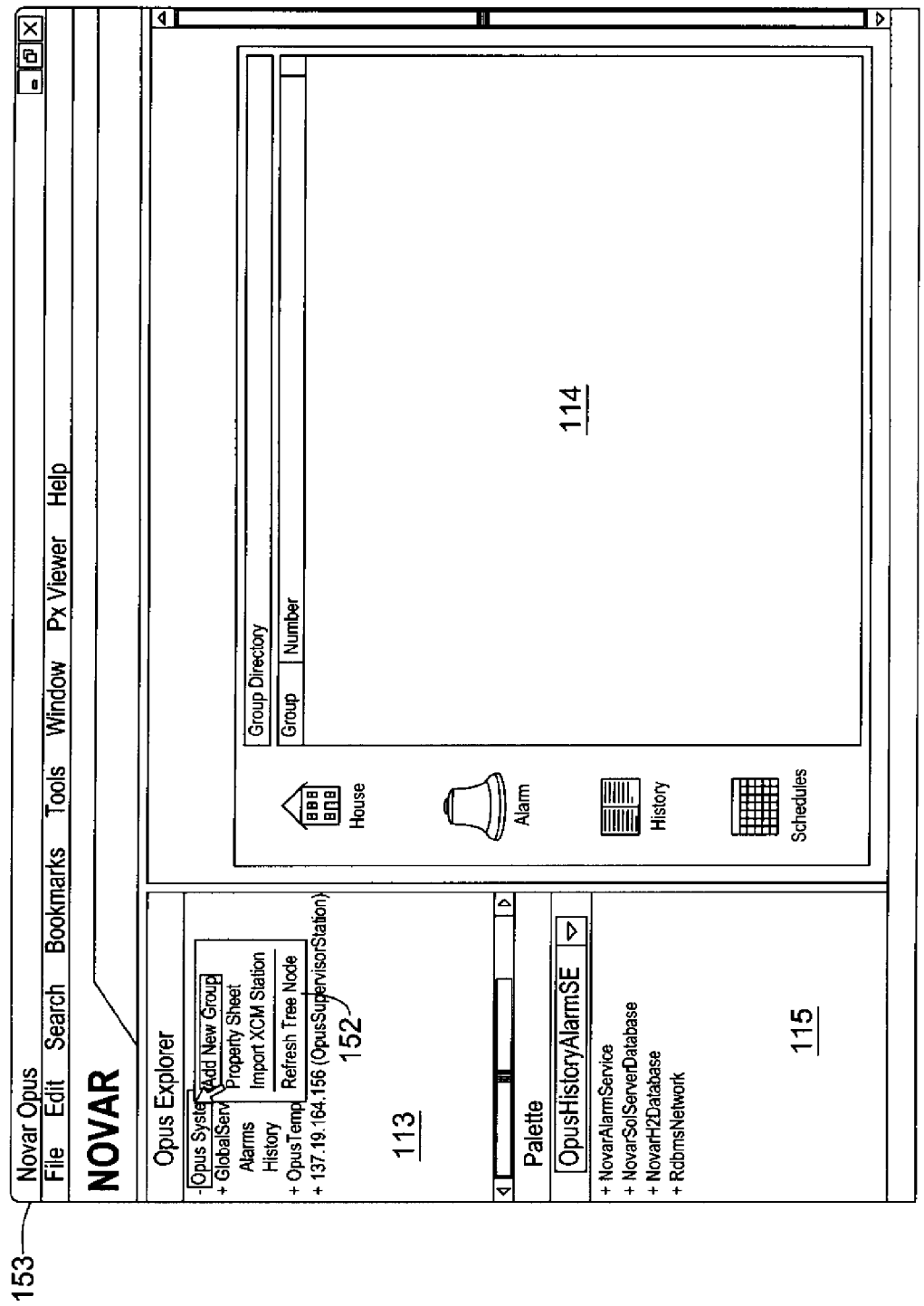
FIG. 19 is a diagram of a screen showing a menu option for creating a business group.
Figure 20:
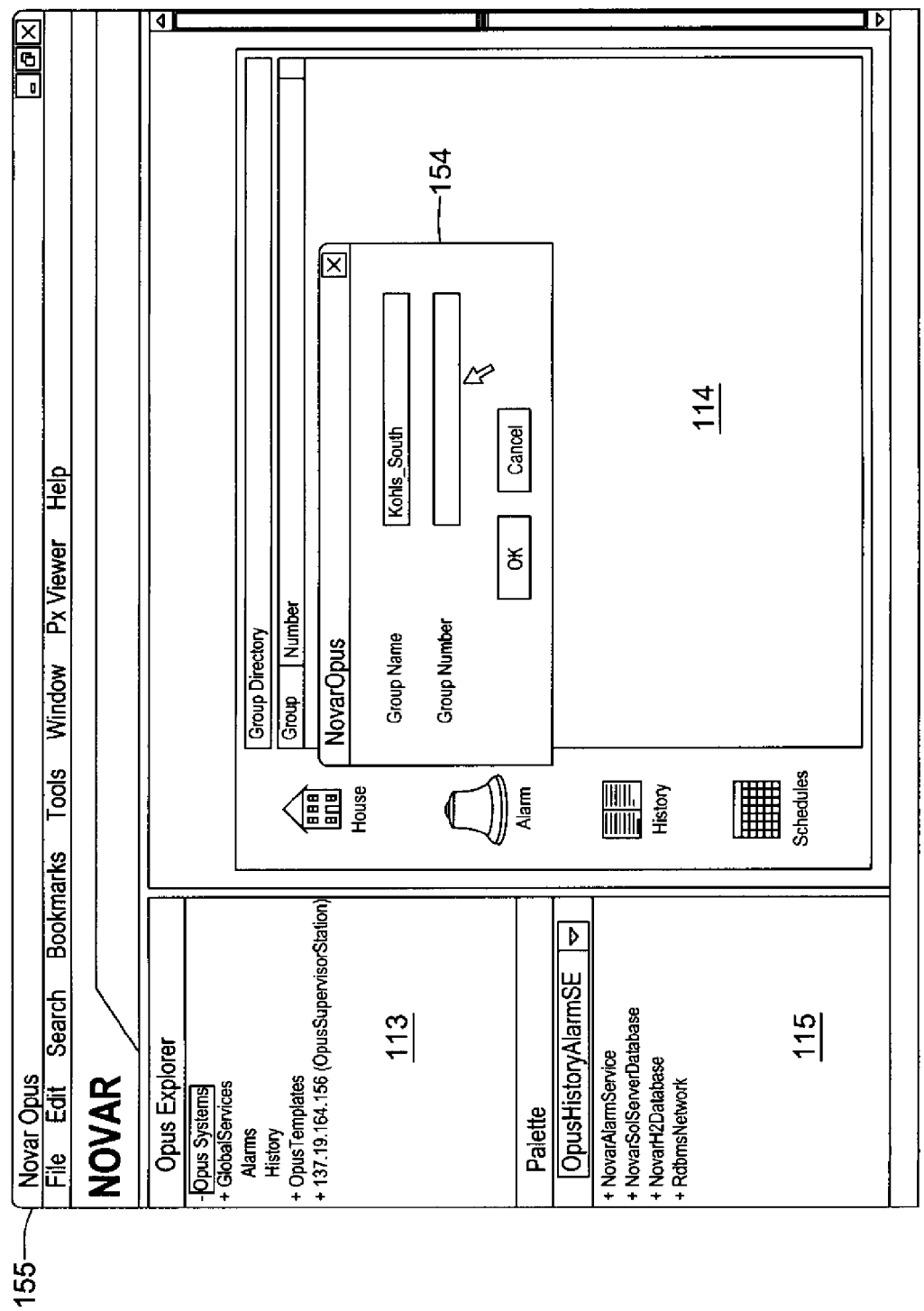
FIG. 20 is a diagram of a screen showing a box for entering the group name and number.

To create a business group at step 132, one may right click for the menu option to add the group as indicated by menu item 152 in screen 153 of FIG. 19. One may click "add new group" to get a box 154 in screen 155 of FIG. 20. The group name such as "Kohls-South" may be typed in box 154. Also, the group number may be entered.

Figure 21:
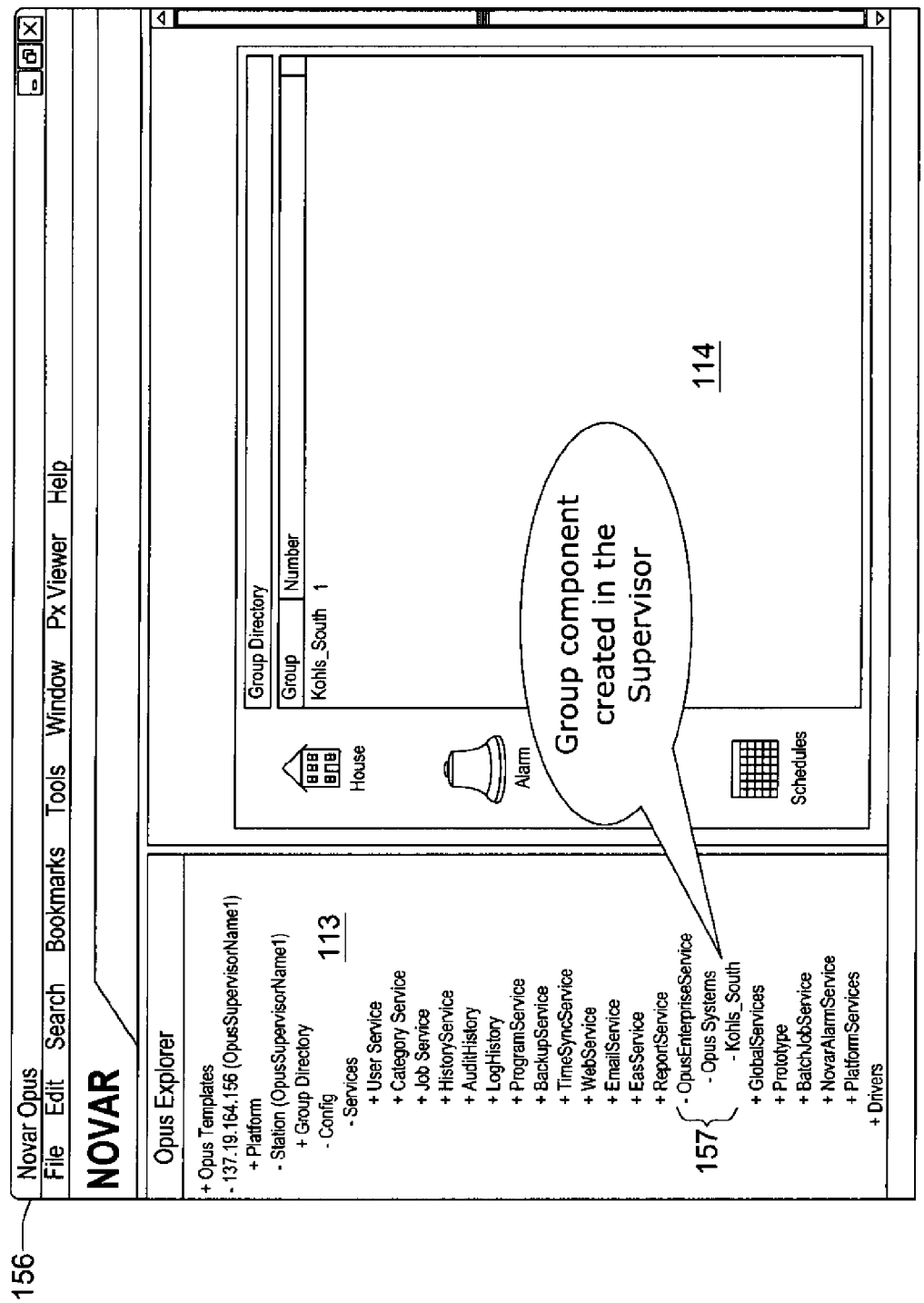
FIG. 21 is a diagram of a screen showing the results from creating a group component.

Screen 156 of FIG. 21 reveals the result of the previous actions which is a group component created in the supervisor.

Lines 157 in view 113 show the hierarchy of enterprise service, the systems and Kohls_South group indicating the creation of the group component.

Figure 22:
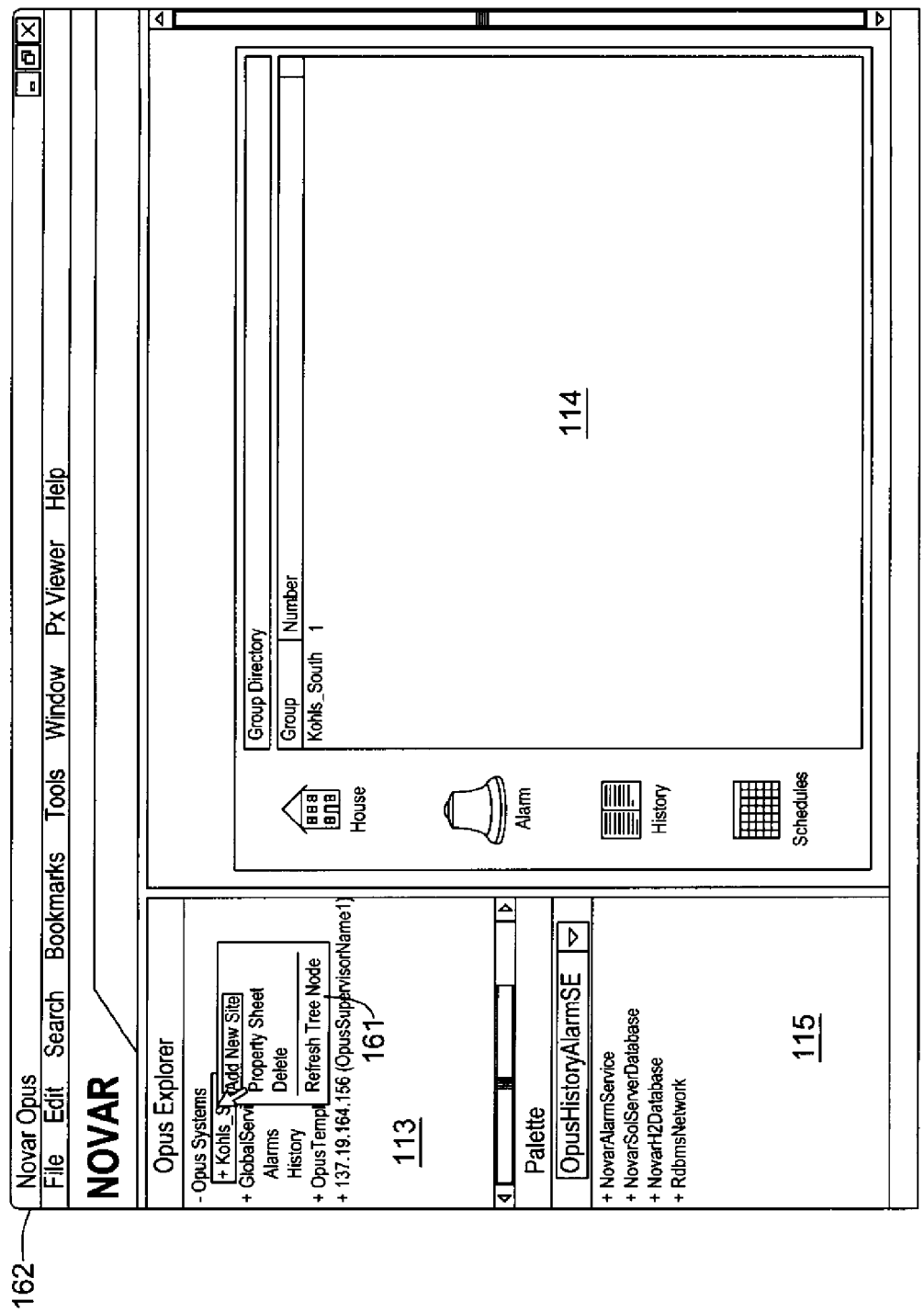
FIG. 22 is a diagram of a screen showing a menu for adding a new site.
Figure 23:
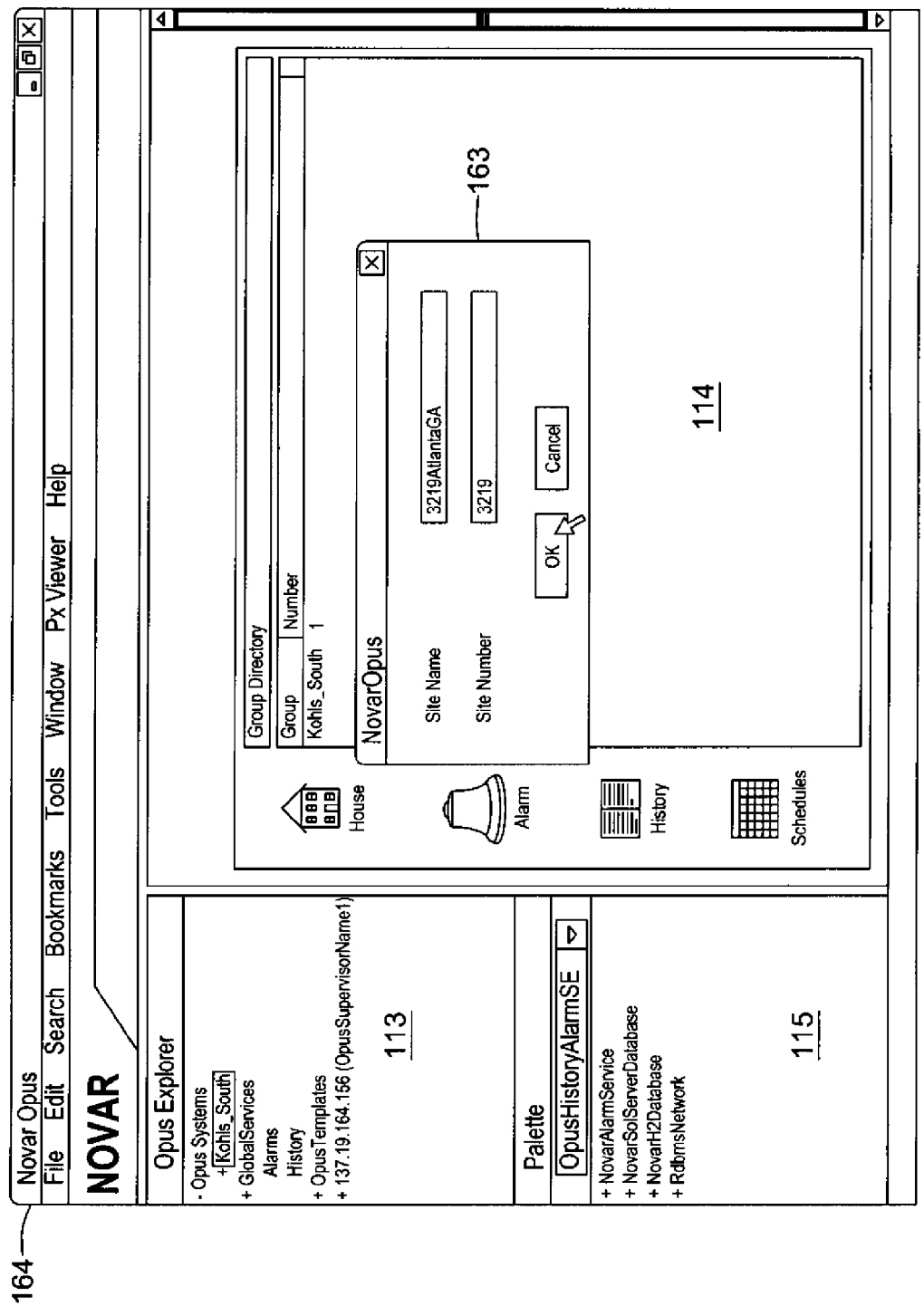
FIG. 23 is a diagram of a screen showing a box for entering the site name and number.
Figure 24:
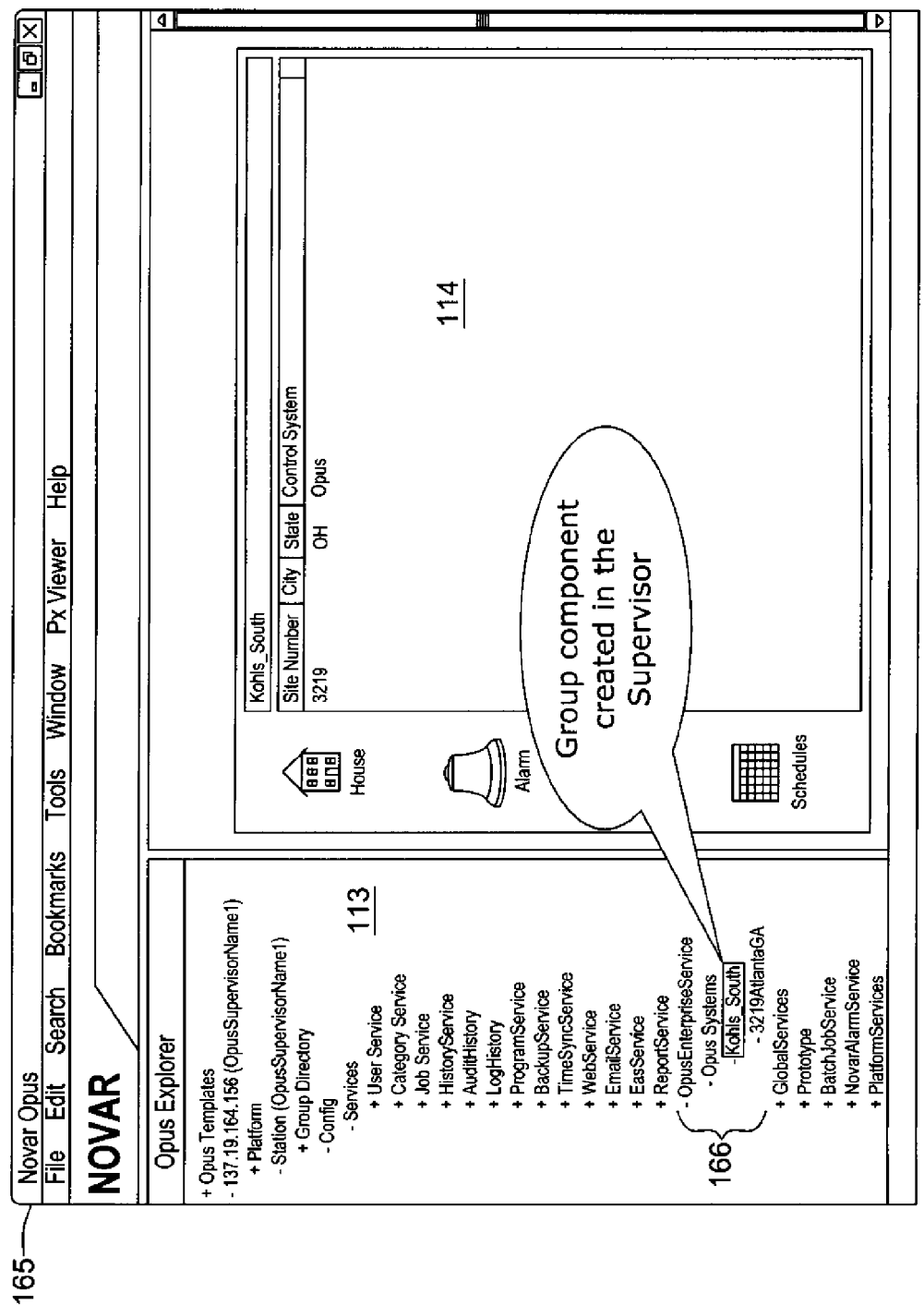
FIG. 24 is a diagram of a screen showing a creation of a site component.

To create a site at step 133, one may right click on a group to invoke the menu option and add the new site by clicking at the first line of menu 161 in screen 162 of FIG. 22. A box 163 may show up as indicated in screen 164 of FIG. 23. The site name and number may be entered in box 163. "OK" in box 163 may be clicked to result in a screen 165 of FIG. 24. One may see that the site component is created in the supervisor. Lines 166 indicate an enterprise service, the systems, Kohls South group and 3219 Atlanta Ga. site, in the explorer portion 113.

Figure 25:
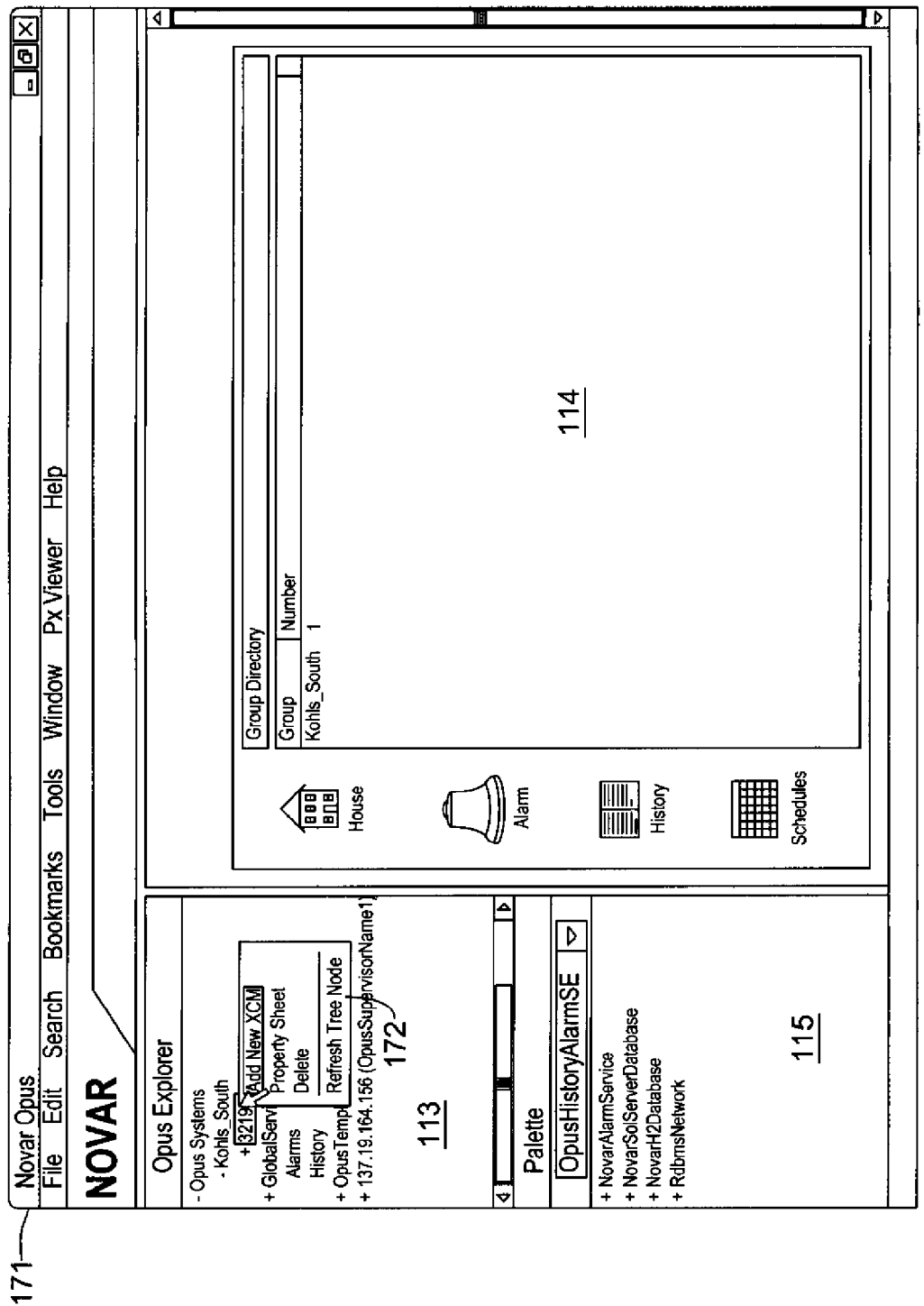
FIG. 25 is a diagram of a screen showing a menu for adding a creating an executive.
Figure 26:
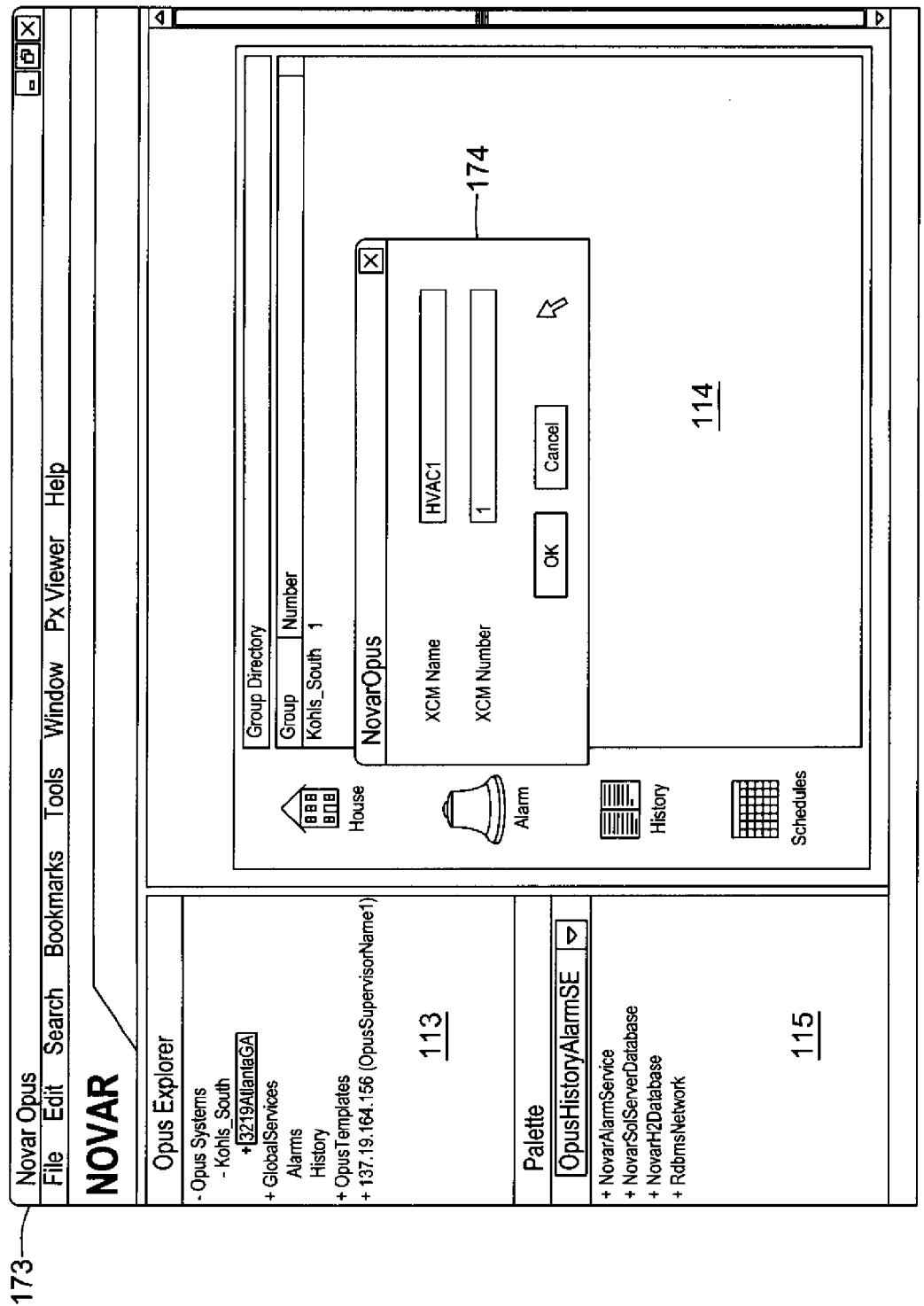
FIG. 26 is a diagram of a screen showing a box for entering the executive name and number.
Figure 27:
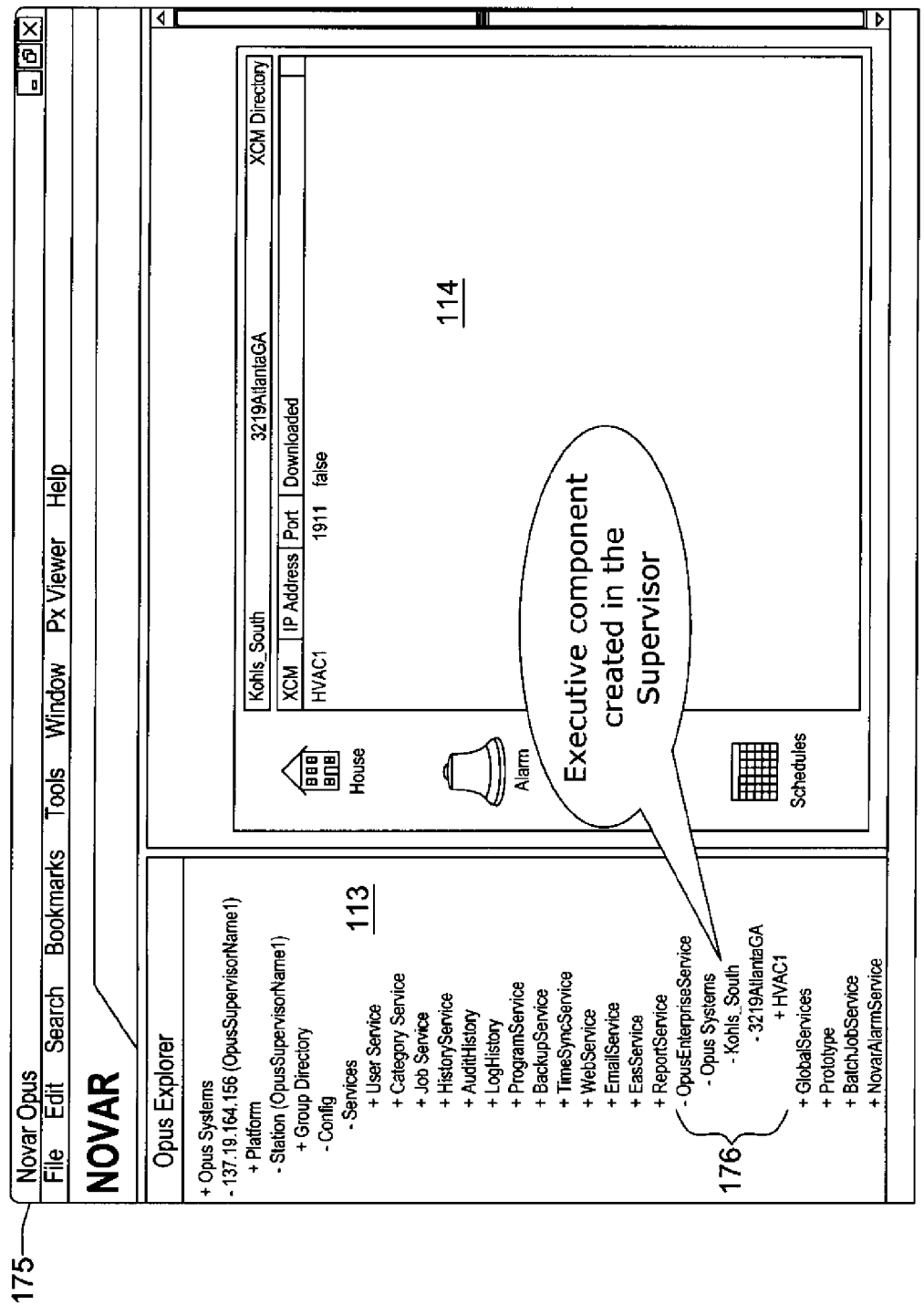
FIG. 27 is a diagram of a screen showing the resultant executive added.

A next step 134 is for creating an executive (XCM). One may right click on a site to invoke a menu option on the site component line in portion 113 of screen 171 of FIG. 25 to get a box 172. The first line of box 172 showing "add new XCM" may be clicked on to add the executive. A box 174 in screen 173 of FIG. 26 may open request the executive (XCM) name and the XCM number. Those items may be filled in and the OK in box 174 be clicked on. A resulting screen 175 of FIG. 27 may show lines 176 in portion 113 which indicate the creating of an executive component in the supervisor. The executive may be an HVAC, site controller, building environment controller, or the like. Lines 76 show the enterprise service, the systems, Kohls South group, 3219 Atlanta Ga. site and the HVAC1 executive (XCM) site controller. All of the last line of lines 176 might not always be shown.

Figure 28:
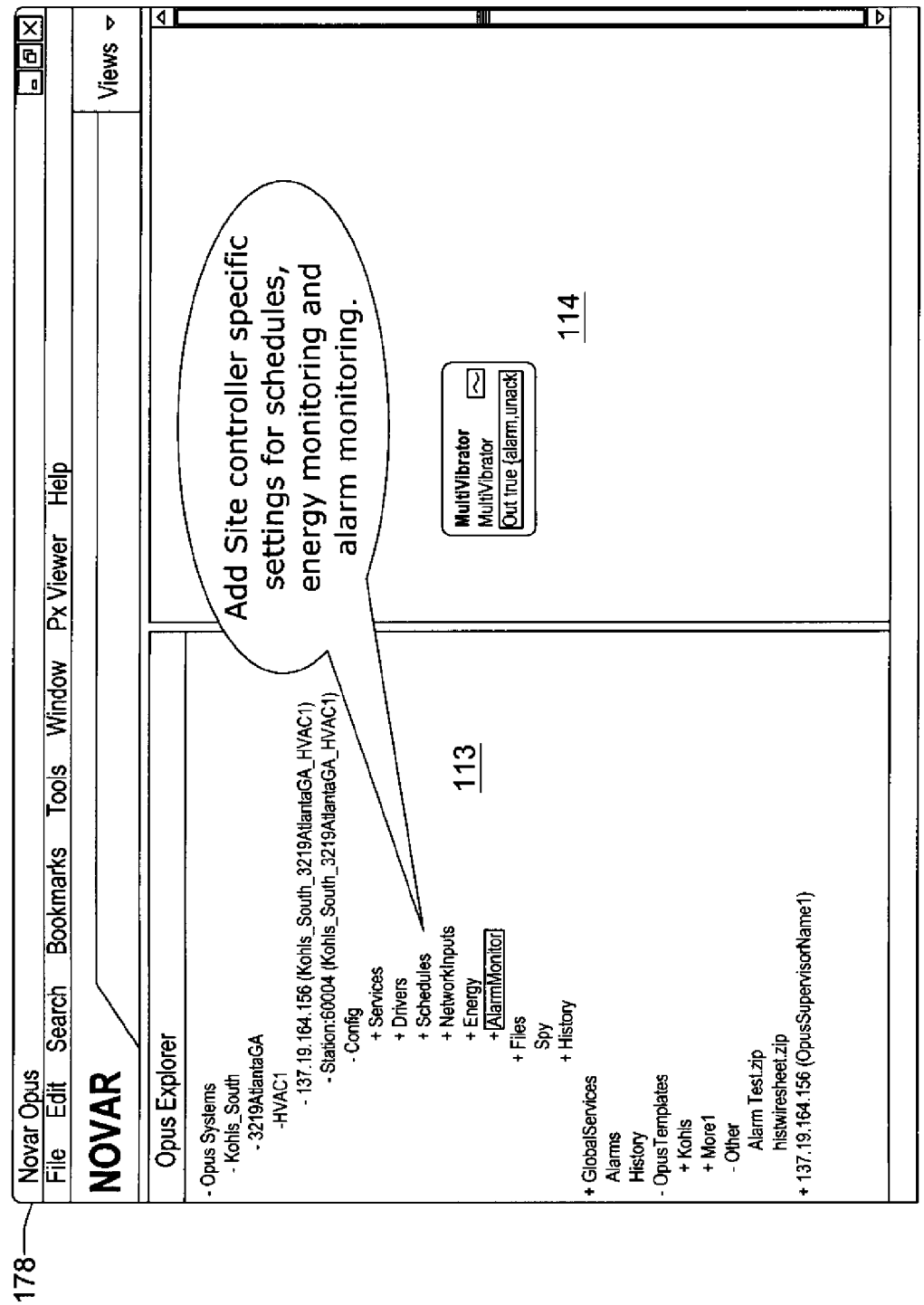
FIG. 28 is a diagram of a screen showing the adding the site controller specific configurations prior to download.

A step 135 may involve a customizing of the site configuration as indicated in screen 178 of FIG. 28. These customizations are the control configuration requirements specifically required by the target site controller.

Figure 29:
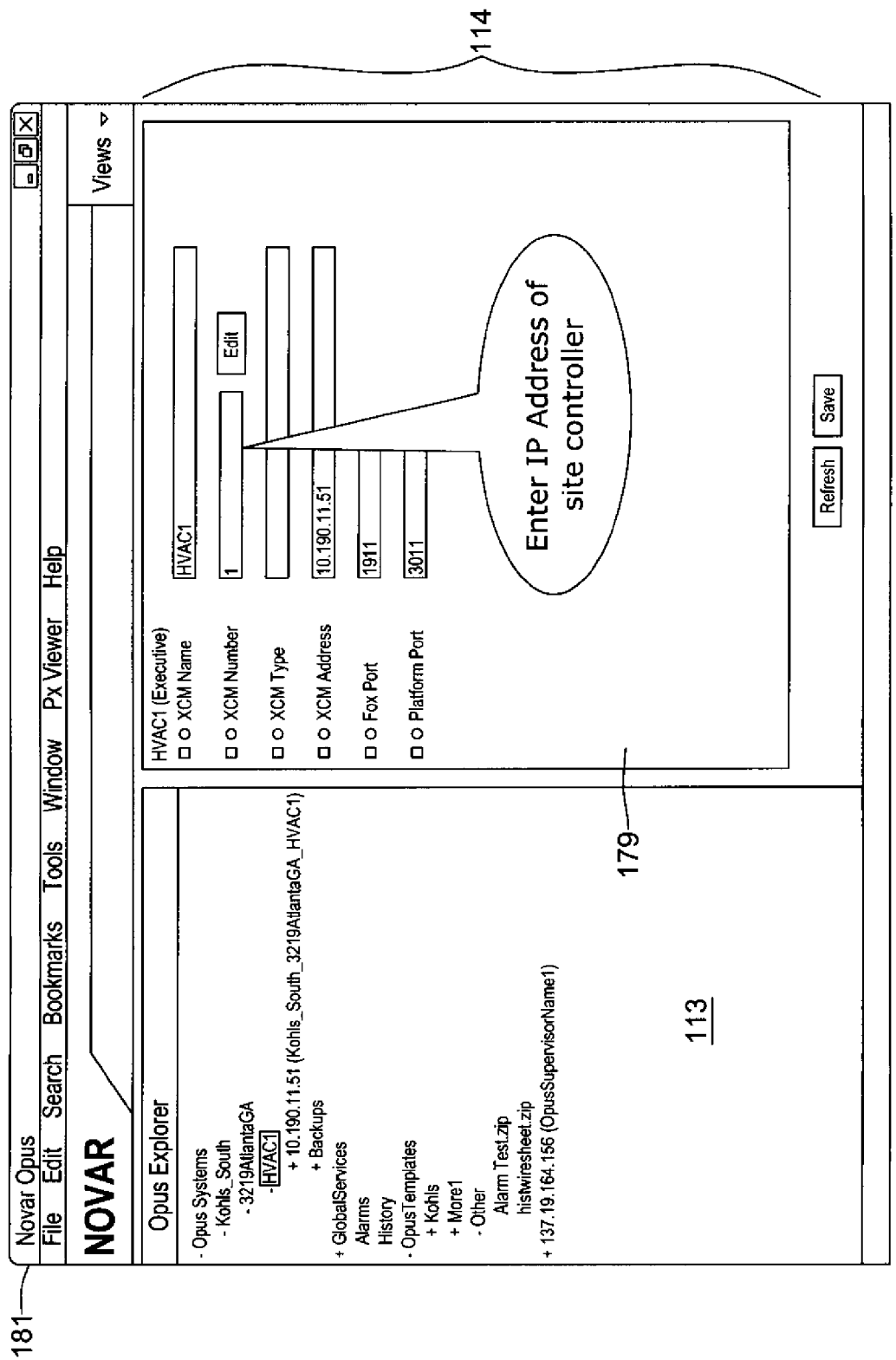
FIG. 29 is a diagram of a screen showing lines for the entering the address of the site controller to prepare for download.
Figure 30:
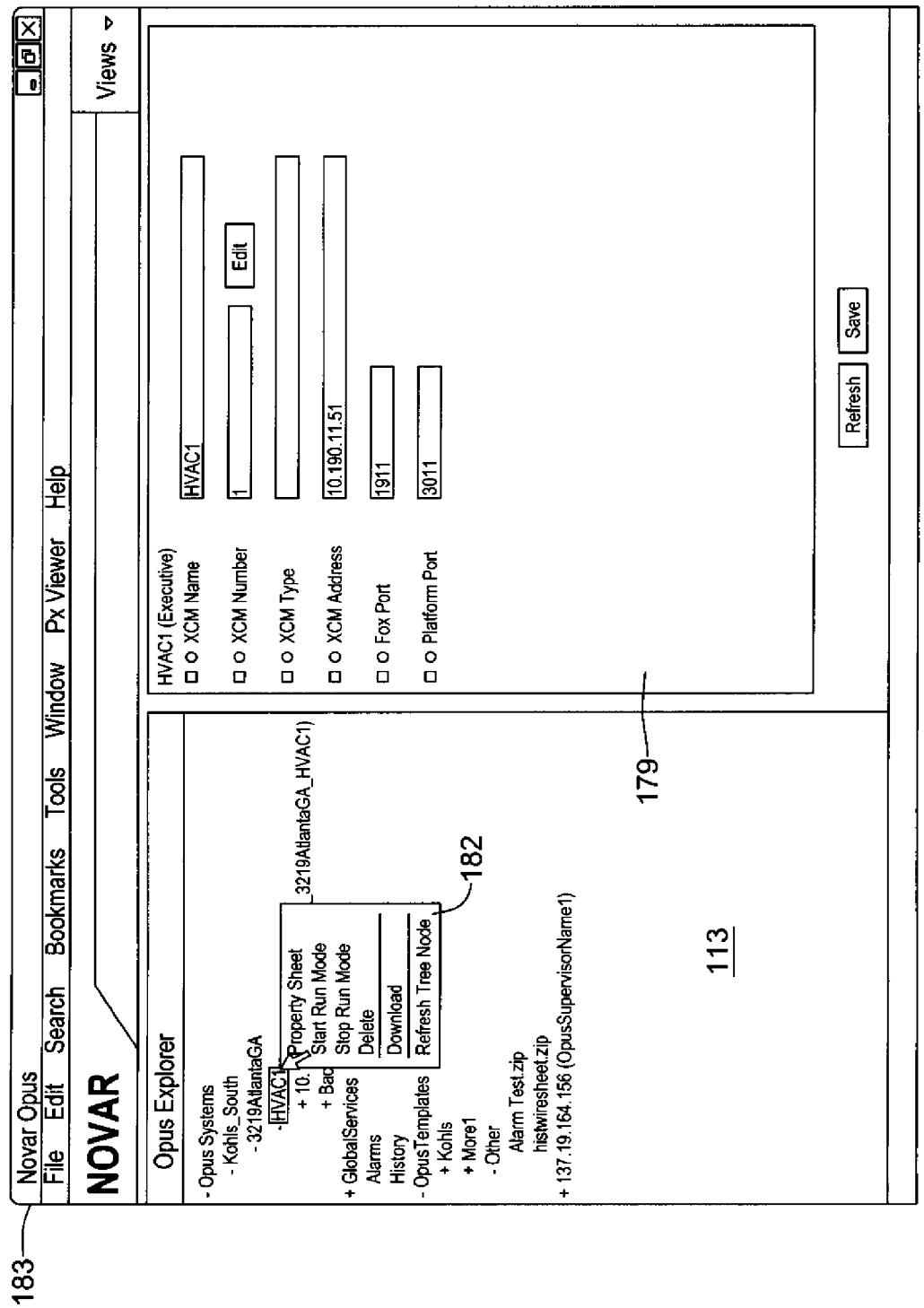
FIG. 30 is a diagram of a screen showing a menu for downloading to the site controller.
Figure 31:
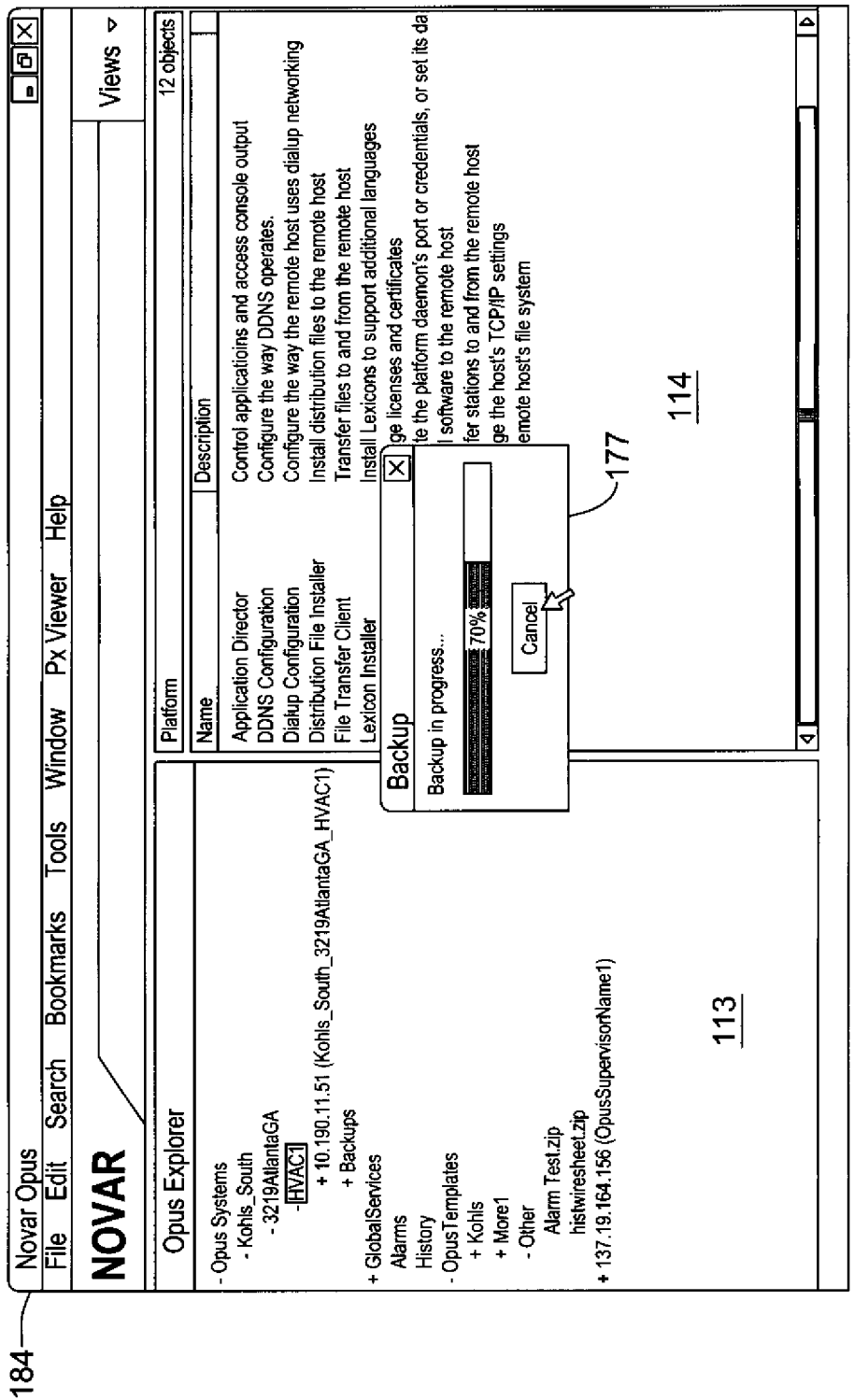
FIG. 31 is a diagram of a screen showing the download and automatic backup of the site controller after a download to it.
Figure 32:
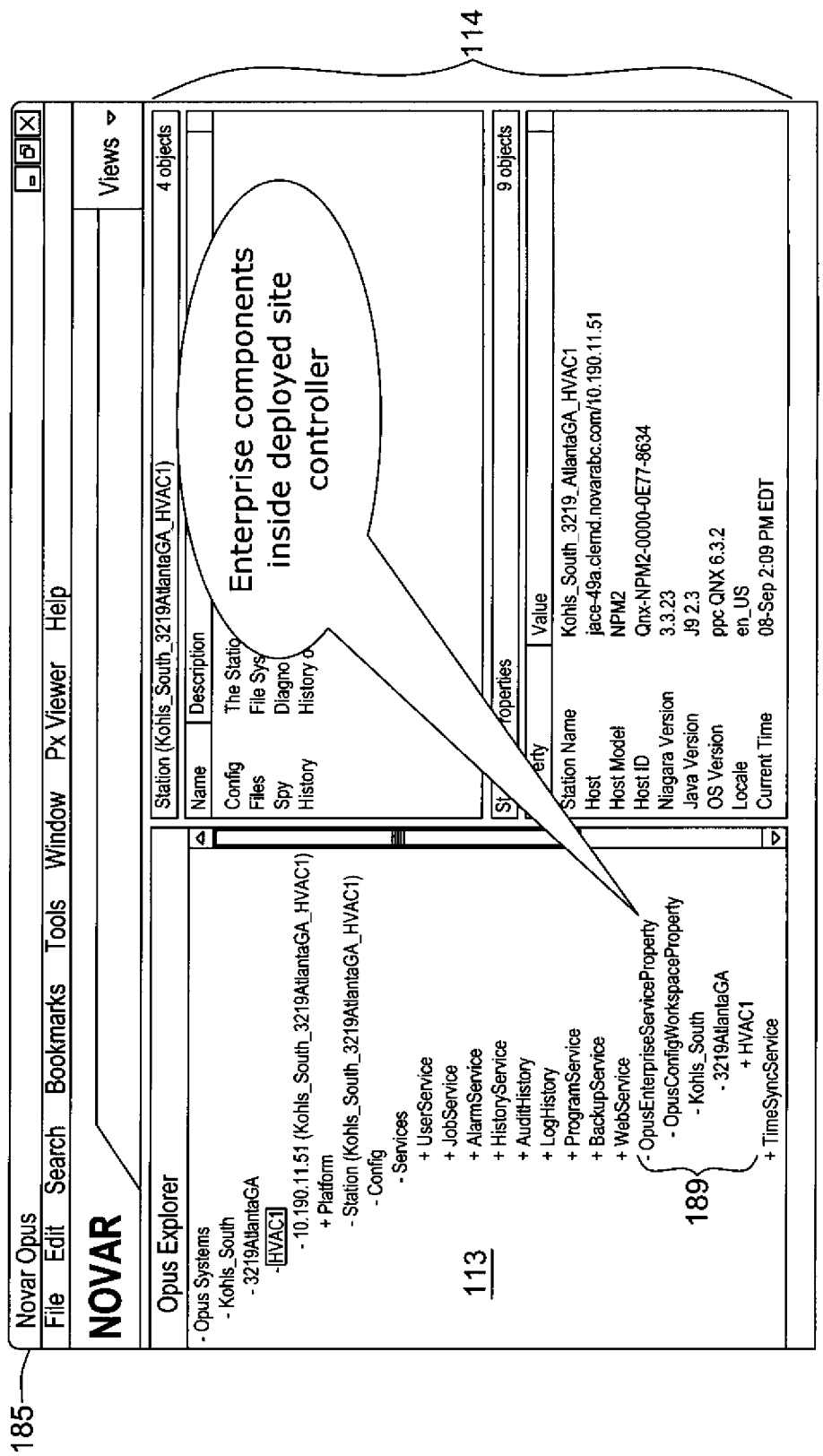
FIG. 32 is a diagram of a screen showing the components in the downloaded site controller.

At step 136, a site controller configuration may be downloaded. A destination IP address of the site controller may be entered in portion 179 of view 114 in screen 181 of FIG. 29. A download to the site controller may be initiated by right clicking to get a menu 182 in view 113 of screen 183 of FIG. 30. The download may be initiated by clicking on the download line of menu 182. The download process will transfer the site controller configuration files from the supervisor to the remote executive (XCM) and then perform an automated backup of the site controller configuration may be performed after the download as indicated by box 177 in screen 184 of FIG. 31. As a result of the deployment, the enterprise components specific to that site controller (i.e., executive) are inside the deployed site controller as indicated by lines 189 in view 113 of screen 185 of FIG. 32.

Figure 33:
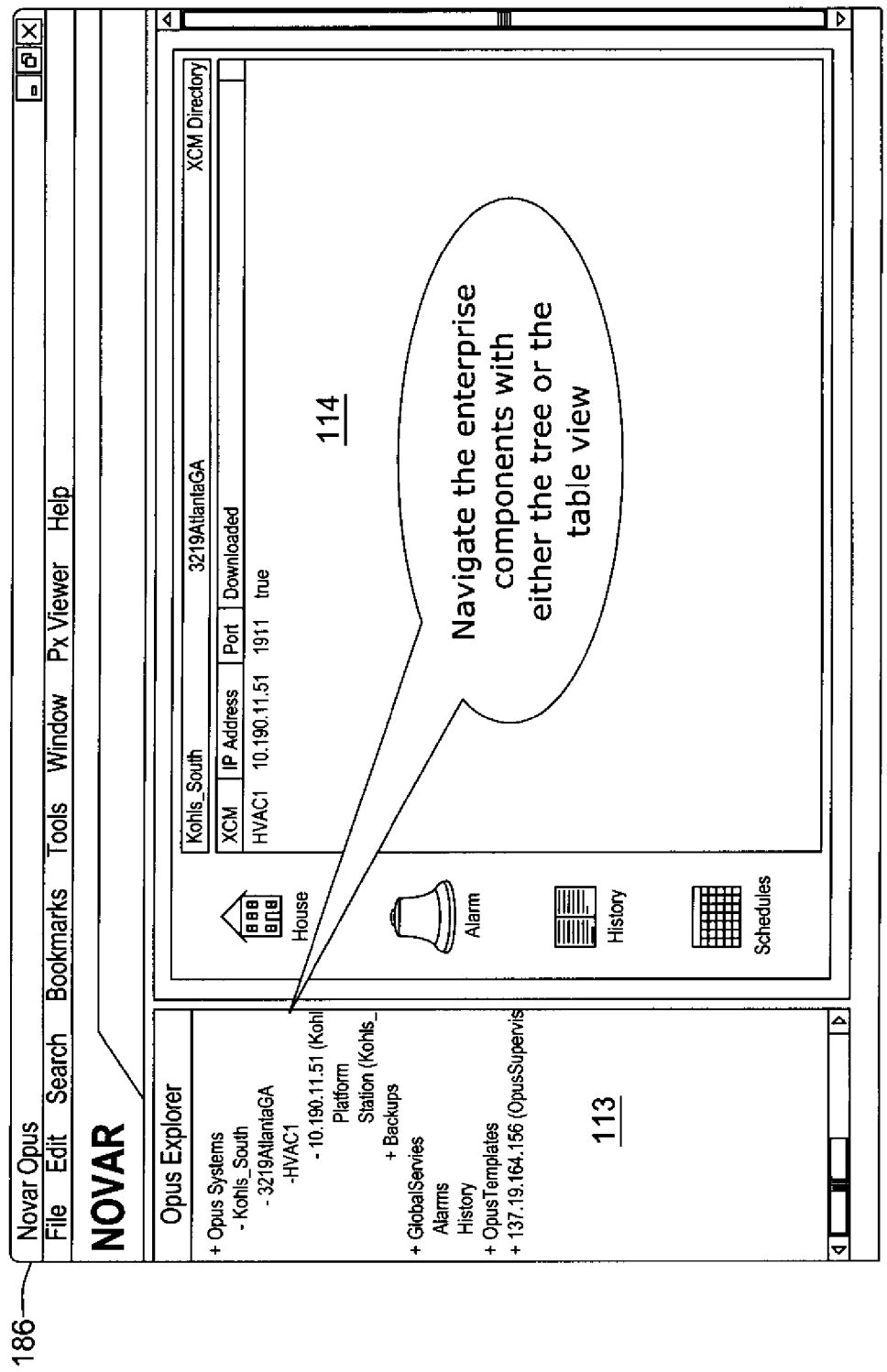
FIG. 33 is a diagram of a screen showing a basis of navigation for accessing the site controller.

Runtime activities may be noted in steps 137 and 138. Step 137 may be to monitor the deployed site controller. One may navigate the enterprise model in the supervisor to access the site controller in screen 186 of FIG. 33. One may navigate the enterprise components with either the tree in view 113 or the table in view 114.

Figure 34:
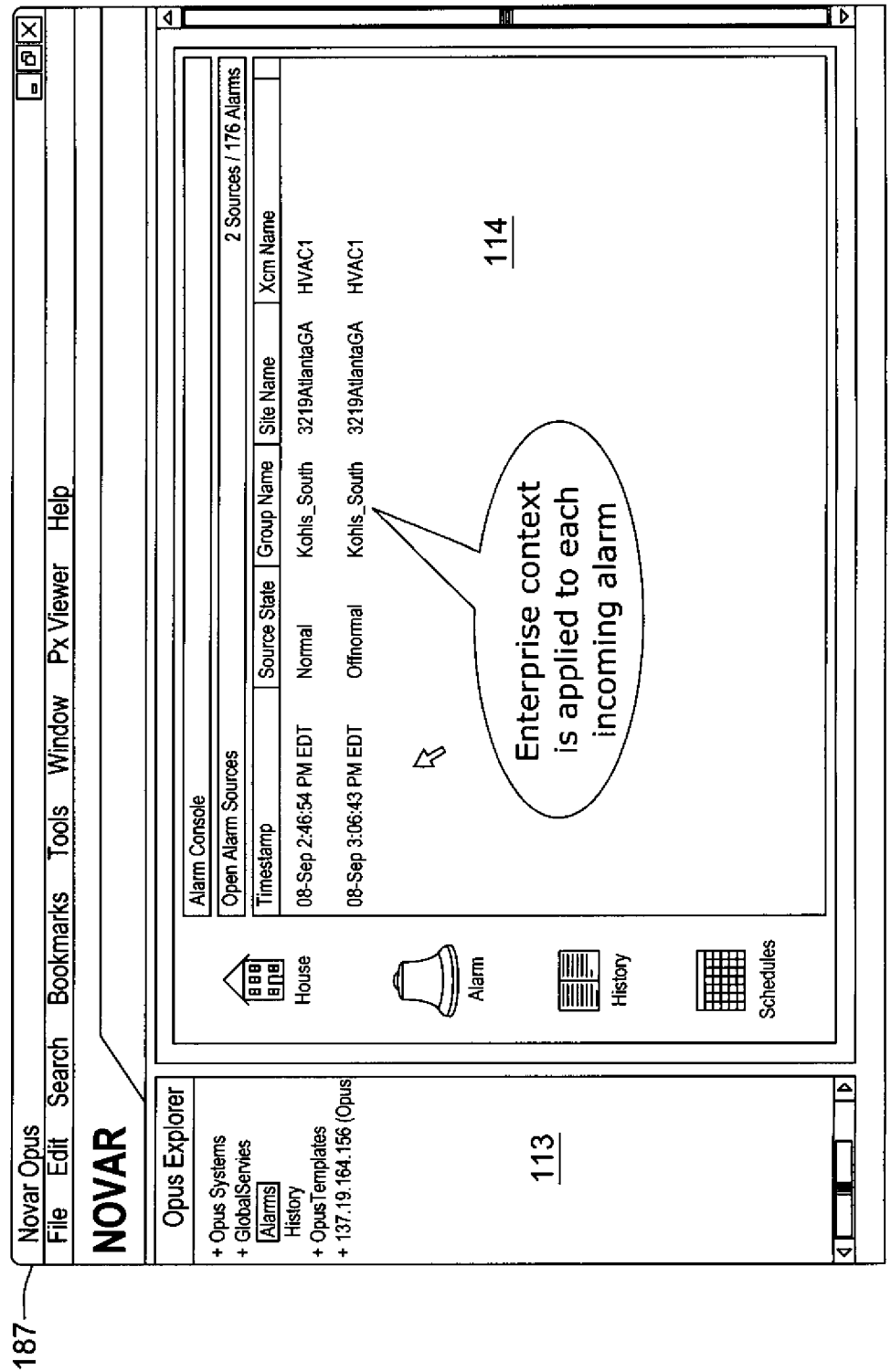

At step 138, the alarm histories may be viewed. In screen 187 of FIG. 34, the enterprise context may be applied to each incoming alarm in view 114. This view may reveal an alarm list which shows the current alarm sources. Shown may be a time stamp, a source state (i.e., normal or off normal), the group name, the site name, and the executive (XCM) name. At item 139, one may end the deployment.

A multi entity management configuration system may have a hierarchical structure having one or more business groups. Each business group may have one or more sites. Each site has one or more executives. Each site may be a business entity having a geographical location. Each executive may be a building environment controller. There may be a navigation and menu system to add, change or delete components. A component may be a business group, site or executive.

An executive may be created is a baseline Niagara™ AX JACE station. There may be an explorer type tree menu for creating and managing a personalized list of business groups, sites and executives. There may be a navigation table for browsing lists of sites and executives of a business group in a hierarchical manner.

A building management configuration system may have an enterprise structure. The structure may have business groups, sites and executive controllers. The business groups, sites and executive controllers may have a hierarchical relationship. Each site may be a business entity having a geographical location. Each executive controller may be a building environment controller. A business group may have one or more sites. A site may have one or more executive controllers.

There may be a screen on a display. A navigational tree may be situated in the screen. Business groups may be at a top level of the tree. Sites may be at a level lower than the top level. Executive controllers may be at a level lower than the level lower than the top level. There may be a navigation path for connection to deployed executive controllers. The screen may have first and second views. The navigational tree may be situated in the first view of the screen. The navigator path for connection to executive controllers may be situated in the second view of the screen.

There may be one or more alarms. The screen may here again have first and second views. The navigational tree may be situated in the first view of the screen. The one or more alarms are shown in the second view of the screen.

There may be an architecture. The architecture may have one or more workstations, connected to a bus, having a supervisor client application for providing a user interface, and a supervisor server connected to the bus. The supervisor server may maintain a database of hierarchical components which include business groups, sites and executive controller, provide for deployment, backup and restores for executive controllers, provide navigational access to deployed controllers, provide supervisory functions, and/or provide provisioning services for updates.

The one or more workstations may have a display for exhibiting a screen. A menu option in the screen may be clicked to add a business group, a site and an executive, controller in that order. The one or more site specific configurations may be added. A configuration of the site may be deployed to result in components in the site.

A model in a supervisor may be navigated to access the site. Alarms may be received from deployed sites.

The may be a approach that has providing a multiple entity configuration, incorporating creating one or more business groups, clicking a menu option to add the one or more business groups, entering an identification of the one or more business groups, creating one or more sites, clicking a menu option to add the one or more sites within a business group, entering an identification of the one or more sites, creating one or more executives, clicking a menu option to add the one or more executives within a site, and entering an identification of the one or more executives. Each site may be a business entity having a geographical location. Here the one or more group businesses, sites and executives may be displayed in a tree on a screen of a display. There may also be an adding a configuration specific to one or more sites, entering a destination address of the one or more sites, deploying the configuration specific to the one or more sites, deploying the one or more sites, backing up the one or more sites, and monitoring one or more deployed sites.

There may also be a navigating an enterprise model in a supervisor to access the one or more deployed sites, and viewing alarms from the one or more deployed sites. Each executive, for example, may be an HVAC system.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A method for site controller discovery and import comprising the following computer implemented features:
   connecting a user interface to a supervisor data server;
   navigating to an enterprise site controllers node in a site navigation tree;
   providing a plurality of options for selecting an approach to import a site controller, where the plurality of options comprises:
   a site controller auto discovery background service automatically detecting site controllers not in the supervisor data server and automatically importing the detected site controller(s),
   a first menu option for an import of a single site controller into the supervisor data server by a user entering location information for the single site controller, and
   a second menu option for a user invoked auto discovery service automatically searching local network to detect site controllers that have enterprise ID but are not in the supervisor data server in response to selection of the second menu option and importing newly discovered site controllers selected by the user, where the first menu option and the second menu option are alternative options;
   selecting an approach to import a site controller configuration; and
   executing the approach to import the site controller configuration.

2. The method of claim 1, wherein:
   a selected approach is a site controller auto discovery service; and
   the site controller auto discovery service comprises:
   a configured site controller auto discovery service; and
   a non-configured site controller auto discovery service.

3. The method of claim 2, wherein the non-configured site controller auto discovery service comprises:
   configuring the site controller auto discovery service;
   storing a site controller auto discovery service configuration in a memory of the supervisor data server; and
   the site controller auto discovery service monitors a communication network for a new remote site controller.

4. The method of claim 3, wherein the site controller auto discovery service comprises:
   initiating an import;
   connecting to the remote site controller;
   pulling a site controller configuration from the site controller and storing the configuration in the supervisor data server; and
   adding the site controller to an enterprise site controllers navigation tree.

5. The method of claim 2, wherein the configured site controller auto discovery service comprises:
   navigating to a communication network of the supervisor data server;
   looking for new remote site controller configurations that have been discovered but not auto-imported; and providing login credentials for a new site controller, to a communication network.

6. The method of claim 1, wherein:
a selected approach is the first menu option of an import of a single site controller;
the import of a single site controller configuration comprises:
  invoking site controller import station menu option;
  providing a remote site controller login to the user interface to initiate an import;
  connecting to a remote site controller;
  determining the remote site controller to have enterprise model information;
  pulling a site controller configuration from site controller configuration data store;
  storing the site controller configuration in a data store of the supervisor data server; and
  adding the site controller to an enterprise site controllers navigation tree.

7. The method of claim 1, wherein:
a selected approach is the first menu option of an import of a single site controller;
the import of a single site controller configuration comprises:
  invoking site controller import station menu option;
  providing a remote site controller login to the user interface to initiate an import;
  connecting to a remote site controller;
  determining the remote site controller not to have enterprise model information;
  prompting for enterprise model information;
  pulling a site controller configuration from site controller configuration data store;
  storing the site controller configuration in a data store of the supervisor data server; and
  adding the site controller to an enterprise site controllers navigation tree.

8. The method of claim 1, wherein:
a selected approach is the second menu option of a user invoked site controller auto discovery;
the user invoked site controller auto discovery comprises:
  invoking site controller auto discovery menu option;
  user interface searching of a local network connected to a communication network for site controllers which are not in the supervisor data server;
  the user interface providing a list of discovered site controllers; and
  selecting one or more site controllers to import.

9. The method of claim 8, wherein the user invoked site controller auto discovery further comprises:
  connecting to a site controller for each site controller selected;
  pulling a site controller configuration from the site controller configuration data store;
  storing the site controller configuration in a data store of the supervisor data server; and
  adding the site controller to an enterprise site controllers navigation tree.

10. The method of claim 6, wherein the import of a single site controller further comprises:
  finalizing an integration of the site controller into the supervisor data server; and
  invoking a backup of the site controller to a storage folder.

11. A method for Opus XCM discovery and import comprising the following computer implemented features:
  connecting an Opus architect to an Opus supervisor server;
  navigating to an Opus systems node in an Opus Explorer;
  providing a plurality of options for selecting an approach to import an XCM station, where the plurality of options comprises:
    an XCM auto discovery background service automatically detecting site controllers not in the supervisor data server and automatically importing the detected site controller(s),
    a first menu option for an import of a single XCM into the supervisor data server by a user entering location information for the single site controller, and
    a second menu option for a user invoked auto discovery service automatically searching local network to detect site controllers that have enterprise ID but are not in the supervisor data server in response to selection of the second menu option and importing newly discovered site controllers selected by the user, where the first menu option and the second menu option are alternative options;
  selecting an approach to import an XCM station; and
  executing the approach to import the XCM station.

12. The method of claim 11, wherein:
a selected approach is an XCM auto discovery service; and
the XCM auto discovery service comprises:
  a configured XCM auto discovery service; and
  a non-configured XCM auto discovery service.

13. The method of claim 12, wherein the non-configured XCM auto service comprises:
  configuring the XCM auto discovery service;
  storing an XCM auto discovery service configuration in a memory of the Opus supervisor server; and
  the XCM auto discovery service monitors a Niagara network for a new remote XCM.

14. The method of claim 13, wherein the XCM auto discovery service comprises:
  initiating an import;
  connecting to the remote XCM;
  pulling a complete XCM station configuration from the Opus XCM and storing the configuration in the Opus Supervisor server; and
  adding the XCM to an Opus Systems navigation tree.

15. The method of claim 12, wherein the configured XCM auto discovery service comprises:
  navigating to a Niagara network of the Opus Supervisor server;
  looking for new remote XCM stations that have been discovered but not auto-imported; and
  providing login credentials for a new XCM, to a Niagara network.

16. The method of claim 11, wherein:
a selected approach is the first menu option of an import of a single XCM;
the import of a single XCM station comprises:
  invoking an XCM import station menu option;
  providing a remote XCM IP and login to the Opus Architect to initiate import;
  connecting to a remote XCM;
  determining the remote XCM to have Opus enterprise model information;
  pulling a complete XCM station configuration from an Opus XCM station configuration data store;
  storing the complete XCM station configuration in a data store of the Opus Supervisor server; and
  adding the XCM to an Opus Systems navigation tree.

17. The method of claim 11, wherein:
a selected approach is the first menu option of an import of a single XCM;

the import of a single XCM station comprises:
  invoking an XCM import station menu option;
  providing a remote XCM IP and login to the Opus Architect to initiate import;
  connecting to a remote XCM;
  determining the remote XCM not to have Opus enterprise model information;
  prompting for Opus enterprise model information;
  pulling a complete XCM station configuration from an Opus XCM station configuration data store;
  storing the complete XCM station configuration in a data store of the Opus Supervisor server; and
  adding the XCM to an Opus Systems navigation tree.

18. The method of claim 11, wherein:
a selected approach is the second menu option of a user invoked XCM auto discovery;
the user invoked XCM auto discovery comprises:
  invoking an XCM auto discovery menu option;
  an Opus Architect searching of a local network connected to a Niagara network for XCMs which are not in the Opus Supervisor server;
  the Opus Architect providing a list of discovered XCMs; and
  selecting one or more XCMs to import.

19. The method of claim 18, wherein the user invoked XCM auto discovery further comprises:
  connecting to an XCM for each XCM selected;
  pulling a complete XCM station configuration from the Opus XCM station configuration data store;
  storing the complete XCM station in a data store of the Opus Supervisor server; and
  adding the XCM to an Opus Systems navigation tree.

20. The method of claim 19, wherein the user invoked XCM auto discovery further comprises:
  finalizing an integration of the XCM into the Opus supervisor data server; and
  invoking a backup of the XCM to a storage folder.

21. An approach for site controller discovery and import comprising the following computer implemented features:
  connecting a user interface to a supervisor data server;
  navigating to an enterprise site controllers node in a site navigation tree;
  providing a plurality of options for selecting a technique to import a site controller, where the plurality of options comprises:
    a site controller auto discovery background service automatically detecting site controllers not in the supervisor data server and automatically importing the detected site controller(s),
    a first menu option for an import of a single site controller into the supervisor data server by a user entering location information for the single site controller, and
    a second menu option for a user invoked auto discovery service automatically searching local network to detect site controllers that have enterprise ID but are not in the supervisor data server in response to selection of the second menu option and importing newly discovered site controllers selected by the user, where the first menu option and the second menu option are alternative options;
  selecting a technique to import a site controller configuration; and
  executing the technique to import the site controller configuration; and
wherein:
  a selected technique is the first menu option of an import of a single site controller;
  the import of a site controller configuration comprises:
    invoking a site controller import station menu option;
    providing a remote site controller login to the user interface to initiate an import;
    connecting to a remote site controller;
    pulling a site controller configuration from a site controller configuration data store;
    storing the site controller configuration in a data store of the supervisor data server; and
    adding the site controller to an enterprise site controllers navigation tree.

* * * * *